United States Patent
Matsuhara

(10) Patent No.: US 10,712,996 B2
(45) Date of Patent: Jul. 14, 2020

(54) IMAGE DISPLAY SYSTEM, APPARATUS FOR SUPPORTING MATERIAL PROVISION, AND APPARATUS FOR ACQUIRING MATERIAL

(71) Applicant: KONICA MINOLTA, INC., Chiyoda-ku, Tokyo (JP)

(72) Inventor: Kenji Matsuhara, Kawanishi (JP)

(73) Assignee: KONICA MINOLTA, INC., Chiyoda-Ku, Tokyo (JP)

(*) Notice: Subject to any disclaimer, the term of this patent is extended or adjusted under 35 U.S.C. 154(b) by 174 days.

(21) Appl. No.: 16/043,467

(22) Filed: Jul. 24, 2018

(65) Prior Publication Data

US 2019/0026057 A1    Jan. 24, 2019

(30) Foreign Application Priority Data

Jul. 24, 2017    (JP) .................. 2017-142514

(51) Int. Cl.

| | |
|---|---|
| *G06F 3/147* | (2006.01) |
| *G06K 19/06* | (2006.01) |
| *G06F 40/103* | (2020.01) |
| *G06F 16/438* | (2019.01) |
| *G06F 16/40* | (2019.01) |

(52) U.S. Cl.
CPC .............. *G06F 3/147* (2013.01); *G06F 16/40* (2019.01); *G06F 16/4393* (2019.01); *G06F 40/103* (2020.01); *G06K 19/06037* (2013.01)

(58) Field of Classification Search
CPC .... G06F 3/147; G06F 40/103; G06F 16/4393; G06F 16/40; G06K 19/06037
See application file for complete search history.

(56) References Cited

U.S. PATENT DOCUMENTS

| | | | |
|---|---|---|---|
| 6,195,093 B1 * | 2/2001 | Nelson .................... | G06F 3/002 434/308 |
| 6,330,976 B1 * | 12/2001 | Dymetman ......... | G06F 3/03545 235/487 |
| 6,396,500 B1 * | 5/2002 | Qureshi .................. | G06T 11/00 345/473 |

(Continued)

FOREIGN PATENT DOCUMENTS

| | | |
|---|---|---|
| JP | 2006-128900 A | 5/2006 |
| JP | 2015-158596 A | 9/2015 |

*Primary Examiner* — Daniel I Walsh
(74) *Attorney, Agent, or Firm* — Buchanan Ingersoll & Rooney PC

(57) ABSTRACT

An image display system including a display control device and terminals is provided. Each of the terminals includes a processor configured to: extract, from a photograph photographed for a specific period, an image representing a code for identifying a material stored in a server; and obtain the code by decoding the image, and a receiver configured to obtain a material from the server based on the code obtained. The display control device includes a controller configured to control the display to display the image. In a first terminal of the terminals, the specific period is a first period. In a second terminal of the terminals, the specific period is a second period. The controller controls the display to display a particular image as the image for the first period. The particular image represents, as the code, a code for identifying a particular material.

14 Claims, 31 Drawing Sheets

(56) References Cited

U.S. PATENT DOCUMENTS

| | | | |
|---|---|---|---|
| 7,107,454 B2* | 9/2006 | Mori | G06F 21/31 |
| | | | 713/156 |
| 7,454,708 B2* | 11/2008 | O'Neal | G06F 3/0481 |
| | | | 715/730 |
| 9,262,647 B2* | 2/2016 | Shibata | G06F 21/31 |
| 9,405,895 B2* | 8/2016 | Hong | G06F 21/35 |
| 9,588,654 B2* | 3/2017 | Satow | G06F 3/0484 |
| 9,609,033 B2* | 3/2017 | Hong | G06F 3/04883 |
| 9,904,984 B1* | 2/2018 | Quinn | G06T 3/60 |
| 10,044,871 B2* | 8/2018 | Bargetzi | H04N 7/147 |
| 10,102,108 B2* | 10/2018 | Araya | G06F 11/3644 |
| 10,158,489 B2* | 12/2018 | Shastri | H04L 9/006 |
| 2002/0019845 A1* | 2/2002 | Hariton | G06Q 10/10 |
| | | | 709/205 |
| 2004/0153969 A1* | 8/2004 | Rhodes | G06F 17/30011 |
| | | | 715/209 |
| 2004/0205347 A1* | 10/2004 | Erol | G06F 17/30914 |
| | | | 713/178 |
| 2006/0070011 A1* | 3/2006 | Matsuhara | G06F 3/0237 |
| | | | 715/816 |
| 2006/0086796 A1 | 4/2006 | Onogi | |
| 2007/0130298 A1* | 6/2007 | Matsuhara | H04N 1/00344 |
| | | | 709/221 |
| 2007/0230703 A1* | 10/2007 | Barrus | H04L 9/0819 |
| | | | 380/277 |
| 2008/0074560 A1* | 3/2008 | Ichieda | H04N 9/3147 |
| | | | 348/739 |
| 2010/0116888 A1* | 5/2010 | Asami | G06K 7/10722 |
| | | | 235/454 |
| 2010/0153887 A1* | 6/2010 | Yamaguchi | G06Q 10/00 |
| | | | 715/854 |
| 2010/0262829 A1* | 10/2010 | Brown | H04L 63/061 |
| | | | 713/171 |
| 2011/0271295 A1* | 11/2011 | Redmann | G06K 9/00496 |
| | | | 725/13 |
| 2012/0138671 A1* | 6/2012 | Gaede | G06Q 20/32 |
| | | | 235/375 |
| 2012/0147125 A1* | 6/2012 | MacDonald | H04N 7/15 |
| | | | 348/14.07 |
| 2012/0278633 A1* | 11/2012 | Frieder | G06F 21/6245 |
| | | | 713/189 |
| 2013/0057684 A1* | 3/2013 | Iwai | G06Q 10/10 |
| | | | 348/143 |
| 2013/0247218 A1* | 9/2013 | Jhingan | G06F 21/36 |
| | | | 726/27 |
| 2014/0117073 A1* | 5/2014 | Bell | H04L 12/1818 |
| | | | 235/375 |
| 2014/0250206 A1* | 9/2014 | Jang | H04N 21/4122 |
| | | | 709/217 |
| 2014/0280729 A1* | 9/2014 | Thomas | H04W 4/003 |
| | | | 709/217 |
| 2014/0281855 A1* | 9/2014 | Bhatnagar | G06F 17/30879 |
| | | | 715/205 |
| 2015/0014417 A1* | 1/2015 | Finlow-Bates | G06K 7/1447 |
| | | | 235/462.41 |
| 2015/0365558 A1* | 12/2015 | Taniguchi | H04N 1/32267 |
| | | | 358/3.28 |
| 2016/0117448 A1* | 4/2016 | Van De Craen | G06F 21/6245 |
| | | | 705/3 |
| 2016/0125401 A1* | 5/2016 | Li | G06Q 10/04 |
| | | | 235/380 |
| 2016/0127331 A1* | 5/2016 | Liu | H04B 1/385 |
| | | | 713/171 |
| 2016/0267370 A1* | 9/2016 | Nishizaki | G06K 7/1417 |
| 2016/0286164 A1* | 9/2016 | Kratz | H04N 7/15 |
| 2017/0046673 A1* | 2/2017 | Shibata | G06Q 20/18 |
| 2017/0068785 A1* | 3/2017 | Experton | G06F 19/322 |
| 2018/0145840 A1* | 5/2018 | Advani | H04L 12/1822 |

* cited by examiner

FIG. 7
6A
PAGE 1
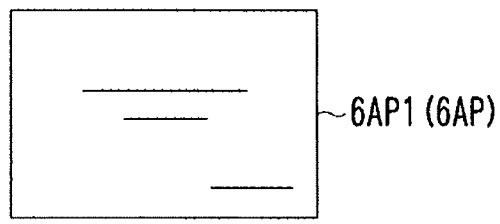
6AP1 (6AP)
PAGE 2
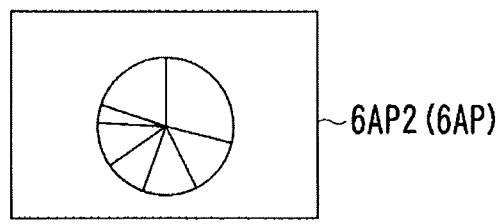
6AP2 (6AP)
PAGE 3
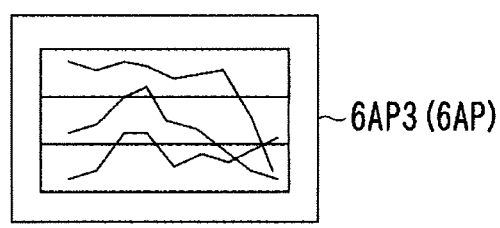
6AP3 (6AP)
PAGE 4
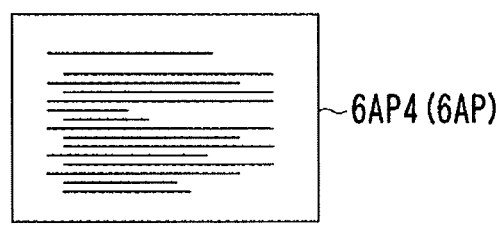
6AP4 (6AP)
PAGE 5
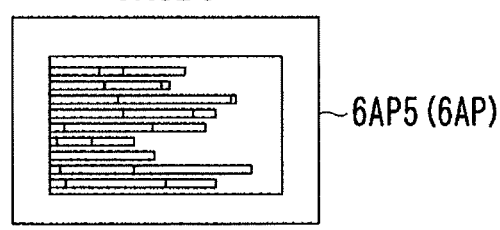
6AP5 (6AP)
⋮

| USER CODE | USER NAME | DEVICE NAME | IP ADDRESS | ACCESS RIGHT |
|---|---|---|---|---|
| U-001 | MARK AAA | Device_01 | 192.168.0.101 | FULL |
| U-002 | SUSAN BBB | Device_02 | 192.168.0.102 | SOME |
| U-003 | TOM CCC | Device_03 | 192.168.0.103 | FULL |
| ... | ... | ... | ... | ... |

| MATERIAL CODE | DELIVERY TARGET | IDENTIFICATION CODE | FILE NAME | SECOND IDENTIFICATION CODE | SECOND FILE NAME | |
|---|---|---|---|---|---|---|
| R-001 | ATTRIBUTES-SPECIFIC | abc001 | report01.pdf | abc002 | report02.pdf | ~7D |
| R-002 | ALL LISTENERS | def001 | estimate.pdf | | | ~7D |
| R-003 | SPECIFIC LISTENER | hgi123 | list.doc | | | ~7D |
| R-004 | ATTRIBUTES-SPECIFIC | pqr111 | clients-1.xls | pqr222 | clients-2.xls | ~7D |

| PAGE NUMBER | MATERIAL CODE | |
|---|---|---|
| 1 | R-001 | ~7A2 |
| 2 | R-002 | ~7A2 |
| 3 | R-003 | ~7A2 |
| 5 | R-004 | ~7A2 |

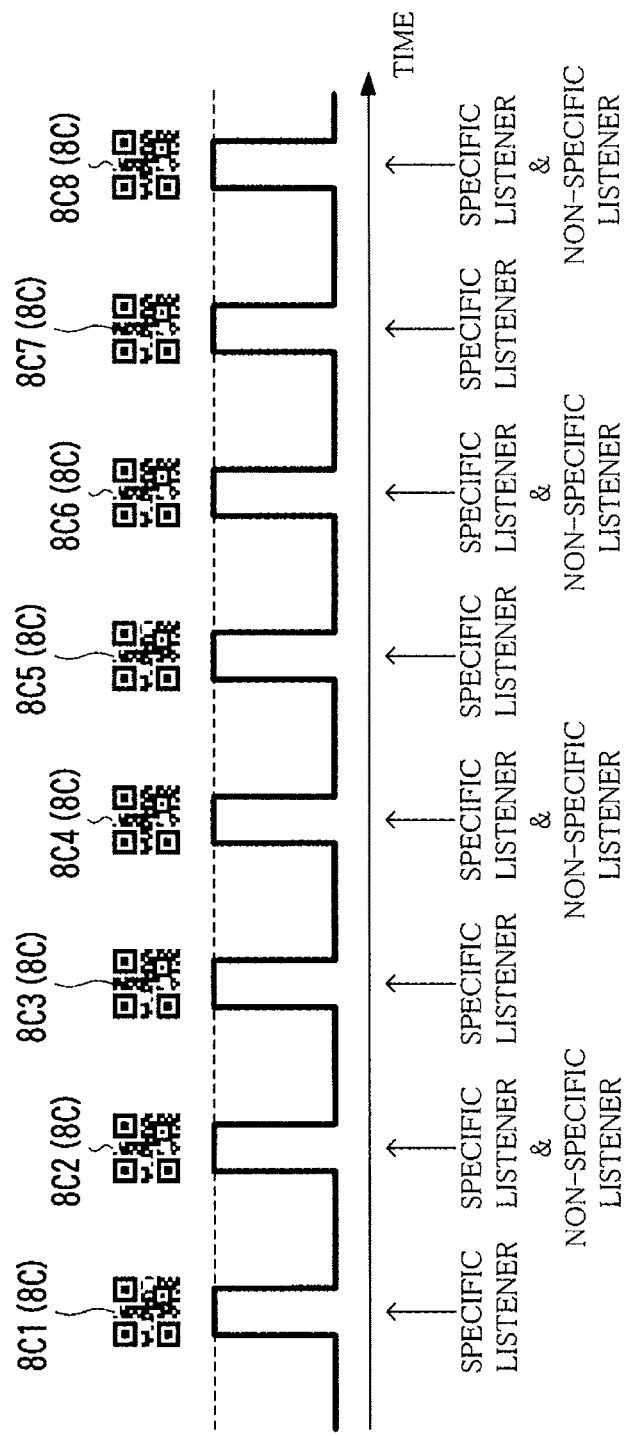

COMBINE

RESTORATION FAILS.

IMAGE DISPLAY SYSTEM, APPARATUS FOR SUPPORTING MATERIAL PROVISION, AND APPARATUS FOR ACQUIRING MATERIAL

The entire disclosure of Japanese Patent application No. 2017-142514, filed on Jul. 24, 2017, is incorporated herein by reference in its entirety.

BACKGROUND

1. Technological Field

The present invention relates to a technology for displaying an image of a material, etc. in a presentation, and so on.

2. Description of the Related Art

Presentation applications, e.g., PowerPoint by Microsoft Corporation and Keynote by Apple Inc., have attained widespread use. Such applications are generally called "presentation software". Such presentation software enables a user to create a material used in a meeting or presentation. Such presentation software also enables the created material to be displayed via a projector or display unit.

The presentation software is suitable especially for creating and displaying a material having a summarized content to be discussed in a meeting or presentation.

The following technologies have been proposed as technologies related to display devices. According to one of the technologies, a video signal output device generates a QR code (registered trademark) from coded original data and acquires a video signal and inserts the generated QR code into the acquired video signal in such a manner that the QR code is hardly recognized with naked eyes when displayed on the display device, and outputs the video signal with the code generated by inserting the QR code to display it on the display device. A mobile phone provided with a camera causes the camera to photograph the QR code displayed on the display device in such a manner that it is hardly recognized with naked eyes, and decodes the QR code photographed by the camera and stores data resulting from decoding it, in a storage medium (English abstract of Japanese Unexamined Patent Application Publication No. 2006-128900).

According to the other technology, a projection device includes: a video terminal that acquires first projection image data; a light source that flickers in a first period; a projection control unit that causes a projection unit to project a first projection image based on the first projection image data on the basis of the flicker of the light source, and causes the projection unit to project encoded information obtained by encoding radio connection information for establishing radio connection for a period of time based on the first period for every second period longer than the first period; and an establishing unit that establishes radio connection with a terminal device on the basis of a radio connection request based on the radio connection information from the terminal device obtained by photographing to decode the projected encoded information (English abstract of Japanese Unexamined Patent Application Publication No. 2015-158596).

In the meantime, a material with detailed content is not suitable for being displayed in a presentation because such a material has too many characters. A supplementary material is not suitable for being displayed in a presentation because a speaker does not have enough time to give explanation for the material. Accordingly, such materials are often printed out and distributed to attendees of the presentation.

For the distribution to the attendees, such materials need to be printed out and prepared in advance of the presentation.

In some cases, materials with content different depending on the attributes of attendees are prepared and distributed selectively to the attendees. For example, a material including classified information is prepared and given to supervisory employees, and a material having no classified information is prepared and given to the other employees. Alternatively, a certain material is given only to the supervisory employees in some cases.

Where different materials need to be prepared depending on the attributes of attendees in this way, a large burden is placed on an organizer of a meeting or seminar.

SUMMARY

The present invention has been achieved in light of such a problem, and therefore, an object of an embodiment of the present invention is to enable distribution of materials to each of attendees more easily than is conventionally possible.

To achieve at least one of the abovementioned objects, according to an aspect of the present invention, an image display system reflecting one aspect of the present invention is an image display system including a display control device configured to control a display unit to display an image, and a plurality of terminals. Each of the terminals includes a hardware processor configured to: extract, from an image photographed for a specific period of time, a code image representing a code for identifying a material stored in a server; and obtain the code by decoding the code image, and a receiver configured to obtain a material from the server based on the code obtained by the hardware processor. The display control device includes a controller configured to control the display unit to display the code image. In a first terminal of the terminals, the specific period of time is a first period of time, and in a second terminal of the terminals, the specific period of time is a second period of time that does not overlap the first period of time. The controller controls the display unit to display a particular code image as the code image for the first period of time, the particular code image representing, as the code, a code for identifying a particular material.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 7 is a diagram showing an example of a main material.

FIG. 8 is a diagram showing an example of listener data.

FIG. 9 is a diagram showing an example of subsidiary material attributes data.

FIG. 10 is a diagram showing an example of reference data.

FIG. 19 is a timing chart depicting a modified example of a time at which a specific listener and a non-specific listener each photographs with a subsidiary terminal.

DETAILED DESCRIPTION OF THE EMBODIMENTS

Hereinafter, one or more embodiments of the present invention will be described with reference to the drawings. However, the scope of the invention is not limited to the disclosed embodiments.

Figure 1:
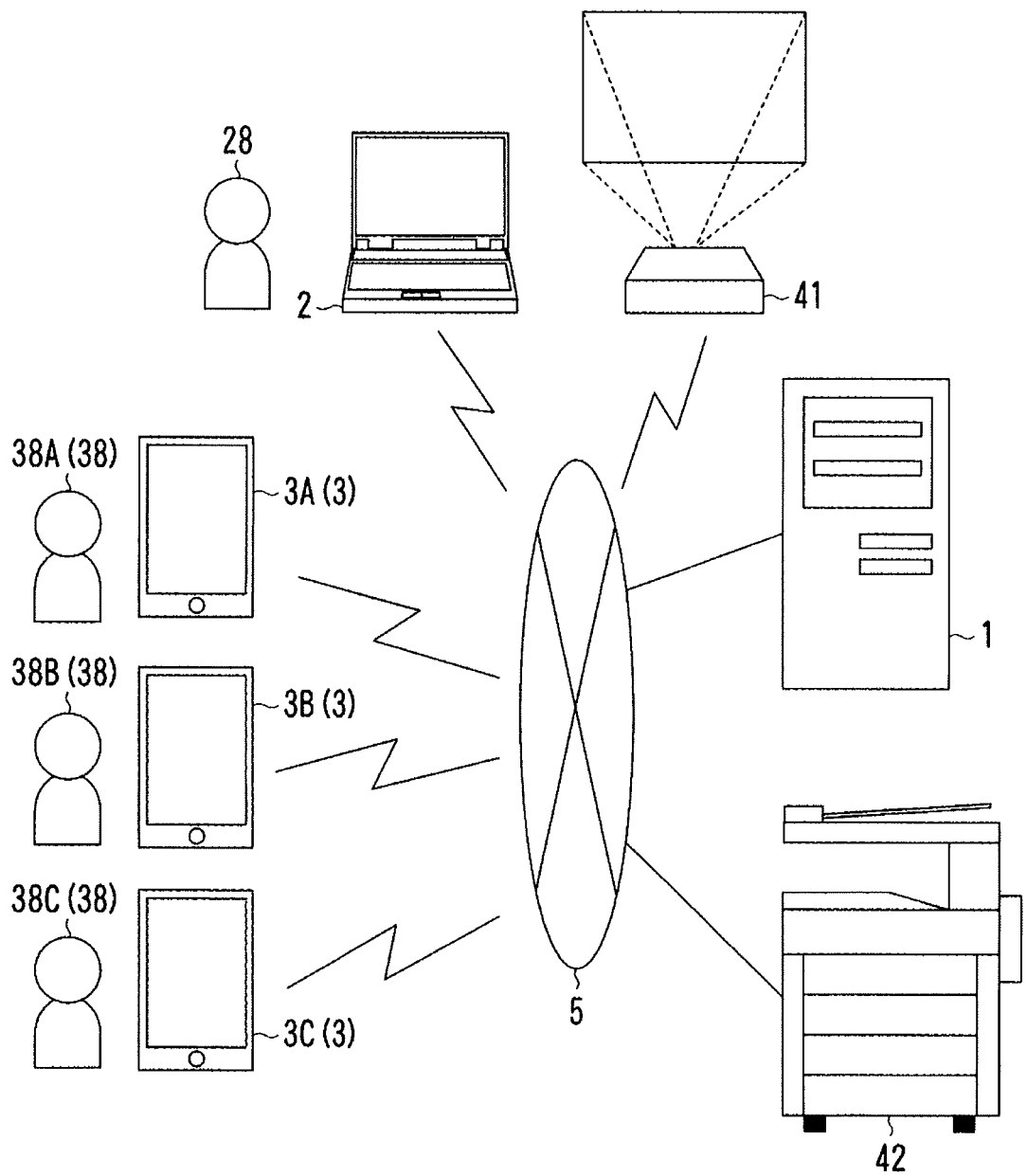
FIG. 1 is a diagram showing an example of the overall configuration of a material display system.
Figure 2:
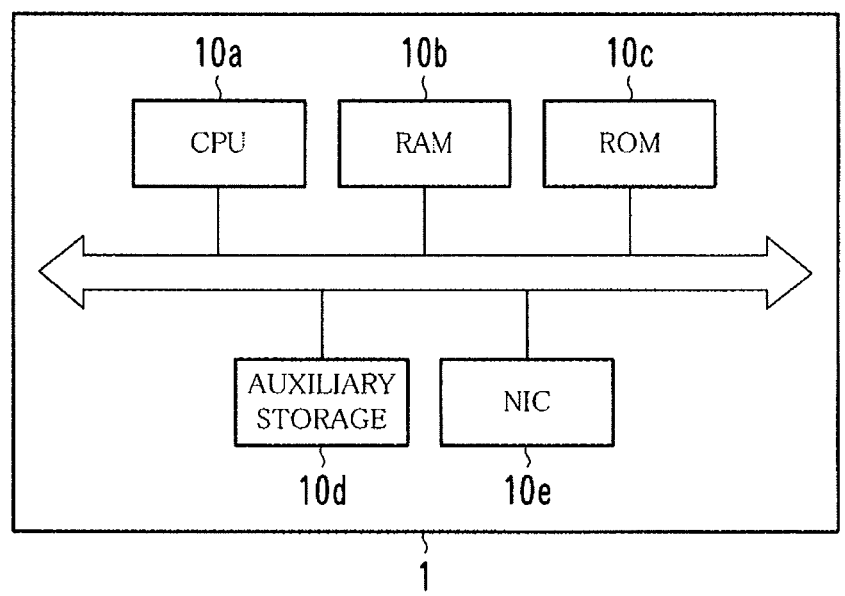
FIG. 2 is a diagram showing an example of the hardware configuration of a material server.
Figure 3:
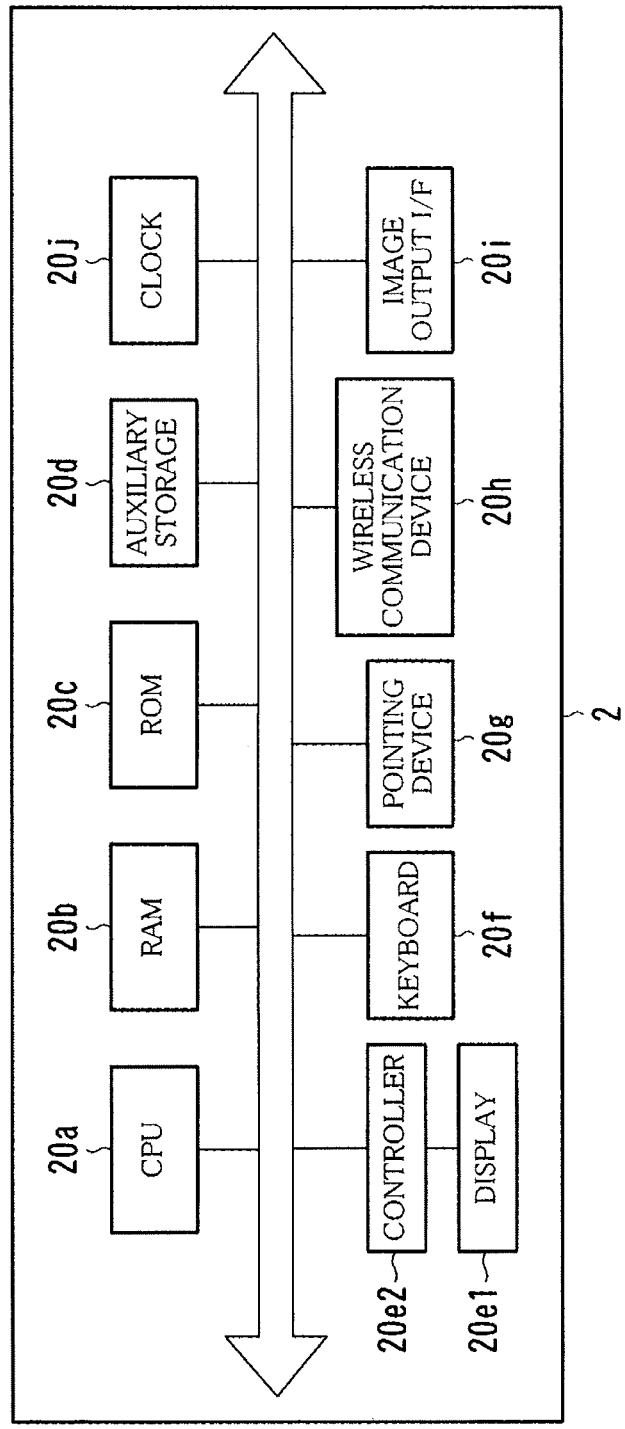
FIG. 3 is a diagram showing an example of the hardware configuration of a main terminal.
Figure 4:
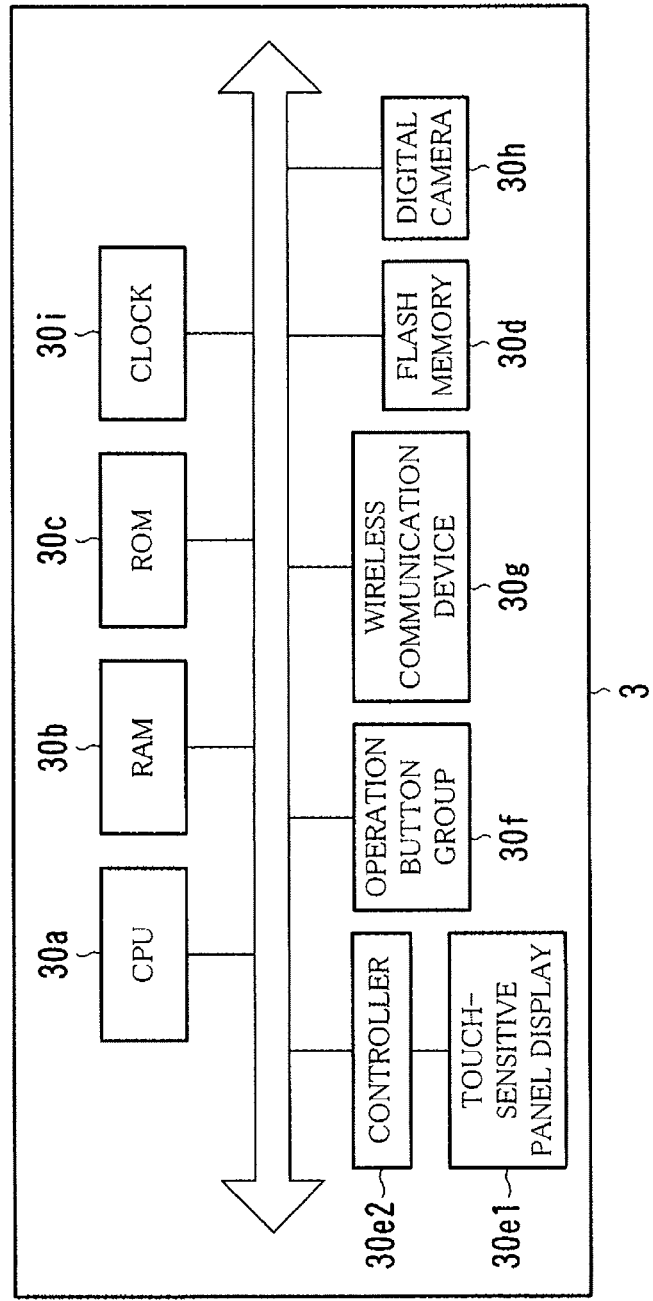
FIG. 4 is a diagram showing an example of the hardware configuration of a subsidiary terminal.

FIG. 1 is a diagram showing an example of the overall configuration of a material display system 100. FIG. 2 is a diagram showing an example of the hardware configuration of a material server 1. FIG. 3 is a diagram showing an example of the hardware configuration of a main terminal 2. FIG. 4 is a diagram showing an example of the hardware configuration of a subsidiary terminal 3.

Referring to FIG. 1, the material display system 100 is configured of the material server 1, the main terminal 2, a plurality of the subsidiary terminals 3, a projector 41, an image forming apparatus 42, a communication line 5, and so on.

The material display system 100 is installed in an organization such as a corporation, government office, or school. The material display system 100 is to display a material (document) in a meeting or presentation made in the organization to allow attendees thereof to look at the material displayed. Description is provided below by taking an example of the use of the material display system 100 for a presentation that supervisory employees and non-supervisory employees attend.

The material server 1, the main terminal 2, the projector 41, the subsidiary terminals 3, and the image forming apparatus 42 are configured to perform communication with one another via the communication line 5. Examples of the communication line 5 include a public line, the Internet, and a Local Area Network (LAN). The LAN includes a router, a hub, a twisted pair cable, and a wireless base station, which enables both wired communication and wireless communication.

The material server 1 serves to manage files for materials display and sends data to the main terminal 2 or the projector 41.

Referring to FIG. 2, the material server 1 is configured of a Central Processing Unit (CPU) 10a, a Random Access Memory (RAM) 10b, a Read Only Memory (ROM) 10c, an auxiliary storage 10d, a Network Interface Card (MC) 10e, and so on.

The MC 10e performs communication with the main terminal 2 and the subsidiary terminals 3 in accordance with a protocol such as Transmission Control Protocol/Internet Protocol (TCP/IP).

The ROM 10c or the auxiliary storage 10d stores, therein, a file server program 10P (see FIG. 5) as one of computer programs. The file server program 10P is to manage files and to provide a file in response to a request made by the main terminal 2 or the subsidiary terminals 3. The auxiliary storage 10d also stores, therein, files on a material-by-material basis.

The file server program 10P is loaded into the RAM 10b and is executed by the CPU 10a. Examples of the auxiliary storage 10d are a hard disk drive and a Solid State Drive (SSD).

The material server 1 is a so-called file server, for example. The material server 1 may be a Network Attached Storage (NAS) or a cloud server. The cloud server is sometimes called an "online storage".

The main terminal 2 is connected to the projector 41. The main terminal 2 causes the projector 41 to display a material primarily used in a presentation (hereinafter, referred to as a "main material 6A") on a projector screen or a wall surface. The main terminal 2 is operated by a user who makes a presentation or an assistant. Hereinafter, such a user is referred to as a "speaker 28". The following description takes an example where an image of a material or the like is displayed (projected) on the projector screen and the speaker 28 operates the main terminal 2.

The main terminal 2 is, for example, a laptop personal computer, a tablet computer, or a smartphone. The following description takes an example where the main terminal 2 is a laptop personal computer.

Referring to FIG. 3, the main terminal 2 is configured of a CPU 20a, a RAM 20b, a ROM 20c, an auxiliary storage 20d, a display 20e1, a controller 20e2, a keyboard 20f, a pointing device 20g, a wireless communication device 20h, an image output interface 20i, a clock 20j, and so on.

The keyboard 20f and the pointing device 20g are used for the speaker 28 to enter a command or information.

The display 20e1 serves to display the main material 6A in accordance with a command or the like entered by the speaker 28. To be specific, the controller 20e2 generates, based on a command from the CPU 20a, a signal for an image displayed in the display 20e1, e.g., the main material 6A, and sends the signal to the display 20e1. The display 20e1 displays an image based on the signal. In this way, the display 20e1 is controlled by the controller 20e2.

The wireless communication device 20h connects to a wireless base station of the communication line 5 based on the standard for a so-called wireless LAN, specifically, the standard for Institute of Electrical and Electronics Engineers (IEEE) 802.11 to perform communication with the material server 1, the subsidiary terminals 3, the projector 41, the image forming apparatus 42, and so on in accordance with a protocol such as TCP/IP.

The image output interface 20*i* is a circuit for outputting an image signal. The image output interface 20*i* is, for example, the High-Definition Multimedia Interface (HDMI) (registered trademark) or a circuit complying with the analog RGB standard.

The clock 20*j* serves to measure a current time. The clock 20*j* connects to a Network Time Protocol (NTP) server at regular intervals (every day, for example) and corrects the time.

The ROM 20*c* or the auxiliary storage 20*d* stores, therein, a presentation program 20P (see FIG. 6) as one of the computer programs. The presentation program 20P is a so-called presentation tool such as PowerPoint developed by Microsoft Corporation or Keynote developed by Apple Inc.

The presentation program 20P is loaded into the RAM 20*b* and executed by the CPU 20*a*. Examples of the auxiliary storage 20*d* are a hard disk drive and an SSD.

The subsidiary terminal 3 serves to display a subsidiary material 6B. The subsidiary material 6B is a supplementary material to be referred to by a user who watches and listens to the presentation. Such a user is hereinafter referred to as a "listener 38".

The listener 38 operates the subsidiary terminal 3. Examples of the subsidiary terminal 3 include portable devices such as a tablet computer or a smartphone. Hereinafter the case is descried in which the subsidiary terminal 3 is a tablet computer.

Referring to FIG. 4, the subsidiary terminal 3 is configured of a CPU 30*a*, a RAM 30*b*, a ROM 30*c*, a flash memory 30*d*, a touch-sensitive panel display 30*e*1, a controller 30*e*2, an operation button group 30*f*, a wireless communication device 30*g*, a digital camera 30*h*, a clock 30*i*, and so on.

As with the display 20*e*1, the touch-sensitive panel display 30*e*1 displays a part or the whole of a document. To be specific, the controller 30*e*2 generates, based on a command from the CPU 30*a*, a signal for an image displayed in the touch-sensitive panel display 30*e*1, e.g., a part of the document, and sends the signal to the touch-sensitive panel display 30*e*1. The touch-sensitive panel display 30*e*1 displays an image based on the signal. In this way, the touch-sensitive panel display 30*e*1 is controlled by the controller 30*e*2. The touch-sensitive panel display 30*e*1 detects a touched location and informs the CPU 30*a* of the touched location.

The operation button group 30*f* includes a button for returning to a so-called start screen, a button for controlling sound volume, and a button for switching between ON and OFF of the power supply.

The wireless communication device 30*g* performs communication via a base station with the material server 1, the main terminal 2, the image forming apparatus 42, and so on in accordance with a protocol such as TCP/IP based on the standard for wireless LAN.

The digital camera 30*h* serves to take an image to generate image data thereof. In this embodiment, the digital camera 30*h* is particularly used, as described later, to photograph a two-dimensional barcode at a time when the subsidiary material 6B is downloaded.

The clock 30*i* serves to measure a current time. As with the clock 20*j* of the main terminal 2, the clock 30*i* connects to the NTP server at regular intervals to correct the time.

The clock 20*j* and the clock 30*i* correct the time at regular intervals as described above. This enables a synchronization to be achieved correctly between a time at which to display a two-dimensional barcode by the main terminal 2 and the projector 41 and a time at which to recognize the two-dimensional barcode by the subsidiary terminals 3.

The ROM 30*c* or the flash memory 30*d* stores, therein, a material viewer program 30P (see FIG. 5) as one of the computer programs. The material viewer program 30P is loaded into the RAM 30*b* and executed by the CPU 30*a*.

The subsidiary terminal 3 is allocated to each listener 38. The listeners 38 are hereinafter referred to as a "listener 38A", a "listener 38B", a "listener 38C", . . . and so on respectively to distinguish one from another. Likewise, the subsidiary terminals 3 allocated to the listeners 38A, 38B, 38C, . . . , and so on are hereinafter referred to as a "subsidiary terminal 3A", a "subsidiary terminal 3B", a "subsidiary terminal 3C", and so on respectively to distinguish one from another.

The projector 41 serves to project an image onto the projector screen based on image data sent by the main terminal 2. The projector 41 is provided with at least one of an image input interface circuit, an NIC, and a wireless communication device as a means for receiving the image data from the main terminal 2. The image input interface circuit is, for example, a circuit complying with the HDMI or the analogue RGB standard. The projector 41 is a commercially available projector.

The description goes on to an example in which the main terminal 2 sends image data to the projector 41 through the HDMI.

The image forming apparatus 42 is an apparatus into which functions such as copying, PC printing, faxing, scanning, and a box function are integrated. The image forming apparatus 42 is generally called a "Multi-Functional Peripheral (MFP)" or a "multifunction device".

The PC printing function is to print an image onto paper based on the image data received from the main terminal 2 or the subsidiary terminal 3.

According to the box function, each user is given a storage area called a "box" or a "personal box". The box function enables each user to save image data and so on to his/her storage area and to manage the image data and so on therein. The box corresponds to a "folder" or a "directory" of a personal computer. The main material 6A and the subsidiary material 6B may be managed in a box of the image forming apparatus 42 instead of the material server 1.

The description goes on to preparation of each of the main material 6A and the subsidiary material 6B, and to processing performed by the individual devices. The description is provided with reference to FIGS. 5 to 15.

[Preparation of the Main Material 6A and the Subsidiary Material 6B]

Figure 5:
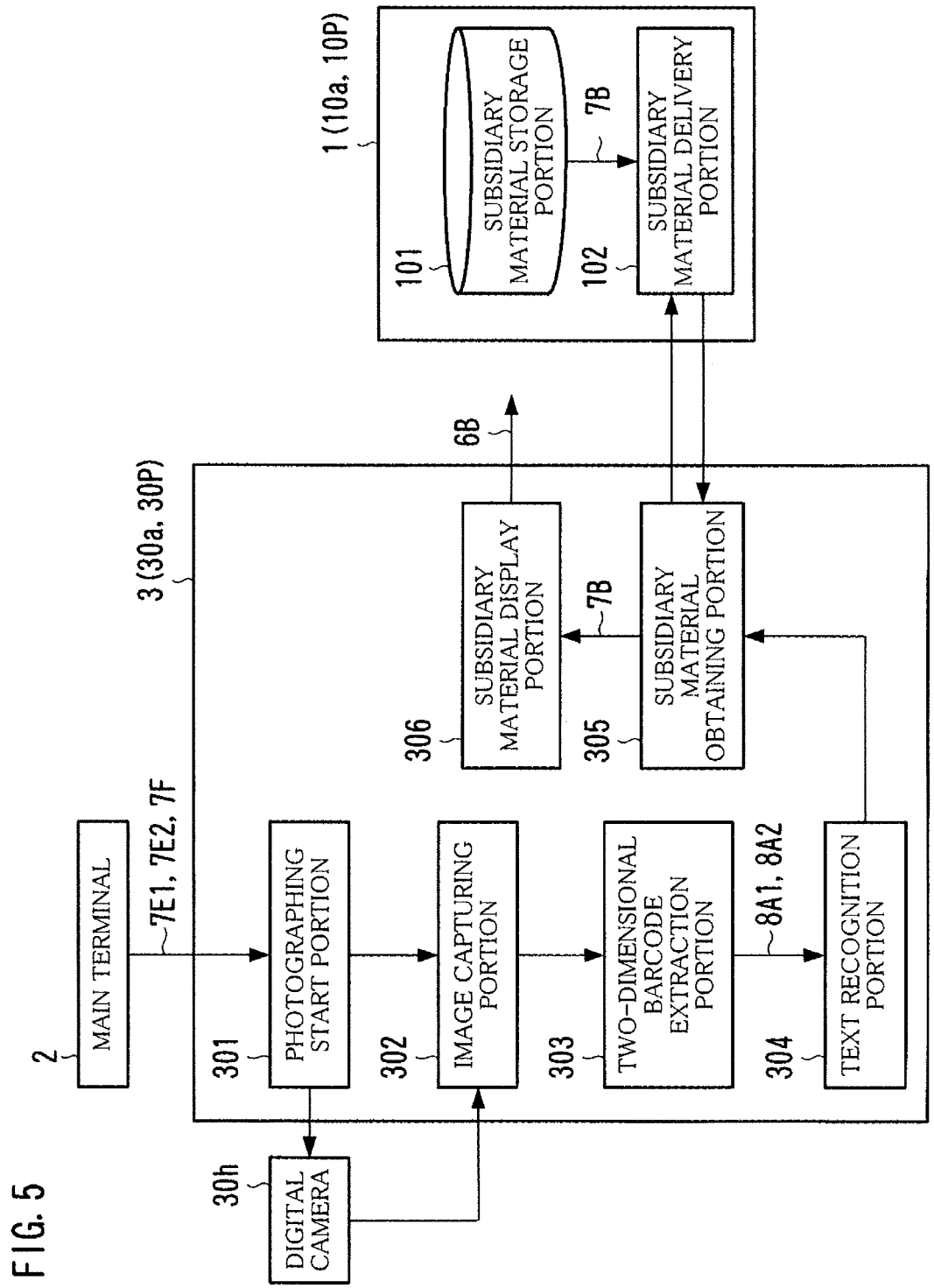
FIG. 5 is a diagram showing an example of the functional configuration of each of a material server and a subsidiary terminal.
Figure 6:
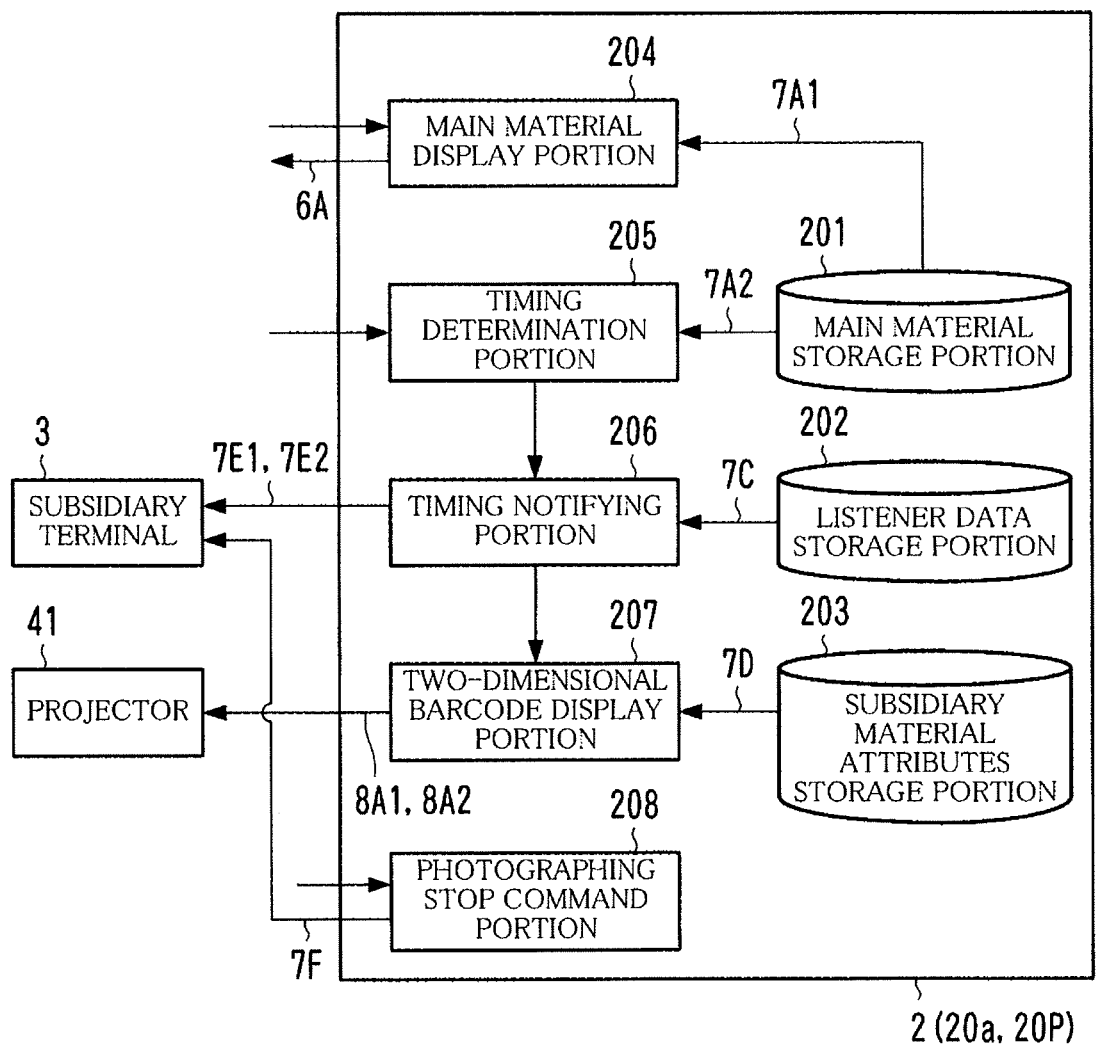
FIG. 6 is a diagram showing an example of the functional configuration of a main terminal.

FIG. 5 is a diagram showing an example of the functional configuration of each of the material server 1 and the subsidiary terminal 3. FIG. 6 is a diagram showing an example of the functional configuration of the main terminal 2. FIG. 7 is a diagram showing an example of the main material 6A. FIG. 8 is a diagram showing an example of listener data 7C. FIG. 9 is a diagram showing an example of subsidiary material attributes data 7D. FIG. 10 is a diagram showing an example of reference data 7A2.

The file server program 10P implements, in the material server 1, the functions of a subsidiary material storage portion 101, a subsidiary material delivery portion 102, and so on, all of which are shown in FIG. 5.

The presentation program 20P implements, in the main terminal 2, the functions of a main material storage portion 201, a listener data storage portion 202, a subsidiary material attributes storage portion 203, a main material display portion 204, a timing determination portion 205, a timing notifying portion 206, a two-dimensional barcode display portion 207, a photographing stop command portion 208, and so on, all of which are shown in FIG. 6.

The material viewer program 30P implements, in the subsidiary terminal 3, the functions of a photographing start portion 301, an image capturing portion 302, a two-dimensional barcode extraction portion 303, a text recognition portion 304, a subsidiary material obtaining portion 305, a subsidiary material display portion 306, and so on, all of which are shown in FIG. 5.

The main material storage portion 201 of the main terminal 2 stores, therein, a file 7A used for displaying the main material 6A. The speaker 28 uses the presentation program 20P to prepare the file 7A by creating the main material 6A before starting the presentation. The file 7A thus prepared is stored into the main material storage portion 201.

Referring to FIG. 7, the main material 6A has a plurality of pages 6AP. The page is sometimes called a "slide" or "screen", particularly, in a presentation application. The pages 6AP are hereinafter described separately as a "page 6AP1", "page 6AP2", "page 6AP3", . . . and so on in order from Page 1. The pages 6AP are given page numbers of "1", "2", "3", and so on in order from Page 1.

The file 7A includes display data 7A1 and reference data 7A2. The display data 7A1 is used to display each of the pages 6AP. The reference data 7A2 is used when the listeners 38 refer to the subsidiary material 6B in the presentation. Only one set of the reference data 7A2 is included in the file 7A in some cases, and a plurality of sets of the reference data 7A2 are included therein in other cases. The reference data 7A2 is detailed later.

The subsidiary material storage portion 101 of the material server 1 stores, therein, a file 7B used for displaying the subsidiary material 6B. The speaker 28 uses word-processing software, spreadsheet software, rendering software, or the like to prepare the file 7B by creating the subsidiary material 6B before starting the presentation. The file 7B thus prepared is stored into the subsidiary material storage portion 101. Alternatively, the speaker 28 may prepare the file 7B by download from a server over the Internet. The subsidiary material 6B may be a document or a moving image.

When there are a plurality of subsidiary materials 6B, the speaker 28 prepares the files 7B of the subsidiary materials 6B to store the files 7B into the subsidiary material storage portion 101.

In some cases, the speaker 28 intends to show all the contents of a certain subsidiary material 6B to a listener 38 who takes a specific position (managerial position, for example); however intends to show only a part of the contents of the subsidiary material 6B to the other listeners 38. The subsidiary material 6B in such a case is hereinafter referred to as a "first limited material". The listener 38 who takes a specific position is hereinafter referred to as a "specific listener", and the other listeners 38 are referred to as "non-specific listeners".

Alternatively, in some cases, the speaker 28 intends to show all the contents of a certain subsidiary material 6B to the specific listener; however intends to show none of the contents of the subsidiary material 6B to the non-specific listeners. In short, the speaker 28 intends to show the certain subsidiary material 6B only to the specific listener in some cases. The subsidiary material 6B in such a case is hereinafter referred to as a "second limited material". Alternatively, a subsidiary material 6B that may be shown to both the specific listener and the non-specific listeners with no limitation is hereinafter referred to as a "no-limit material".

The description goes on to the case where the specific position is a managerial position, in other words, where a person who holds a managerial position is the specific listener and the other persons are the non-specific listeners.

As for the first limited material, the speaker 28 prepares, as the file 7B, a file for specific listener and a file for non-specific listener. As for the no-limit material, the speaker 28 prepares only one file 7B as the file 7B. As for the second limited material, the speaker 28 prepares only one file 7B as the file 7B.

The case is hereinafter described in which four subsidiary materials 6B1 to 6B4 are used as the subsidiary material 6B. Suppose that the subsidiary materials 6B1 and 6B4 correspond to the first limited material, the subsidiary material 6B3 corresponds to the second limited material, and the subsidiary material 6B2 corresponds to the no-limit material.

For the subsidiary material 6B1, the speaker 28 prepares, as the file 7B, a file for specific listener and a file for non-specific listener. Hereinafter, the former file is called a "file 7B11" and the latter file is called a "file 7B12". Likewise, for the subsidiary material 6B4, the speaker 28 prepares, as the file 7B, a file 7B41 for specific listener and a file 7B42 for non-specific listener.

The speaker 28 prepares a file 7B2 as the file 7B for the subsidiary material 6B2. The speaker 28 also prepares a file 7B3 as the file 7B for the subsidiary material 6B3.

As shown in FIG. 8, the listener data storage portion 202 of the main terminal 2 stores, therein, the listener data 7C for each of the listeners 38. The listener data 7C indicates the following information.

The "user code" is an identifier of the listener 38 given the corresponding listener data 7C. The "user name" is the name of that listener 38. The "device name" is the name of the subsidiary terminal 3 allocated to that listener 38. The "IP address" is an IP address given to the subsidiary terminal 3.

The "access right" is a right, given to the corresponding listener 38, to view the subsidiary material 6B. As described above, the specific listener is allowed to view all the contents of the subsidiary material 6B with no limitation while the non-specific listeners are allowed to view only a part of the subsidiary material 6B. Where the listener 38 corresponds to the specific listener, he/she is given an access right to view all the contents of the subsidiary material 6B. In such a case, as shown in FIG. 8, the "access right" indicates "full" which means the right to view all the contents of the subsidiary material 6B. Where the listener 38 corresponds to the non-specific listener, he/she is given an access right to view a part of the subsidiary material 6B. In such a case, the "access right" indicates "some" which means the right to view a part of the subsidiary material 6B.

The listener data 7C is prepared in advance by an administrator of the material display system 100 and is stored into the listener data storage portion 202.

Referring to FIG. 9, the subsidiary material attributes storage portion 203 stores, therein, the subsidiary material attributes data 7D for each of the subsidiary materials 6B. The subsidiary material attributes data 7D indicates the following information.

The "material code" is an identifier of the subsidiary material 6B corresponding to the subject subsidiary material attributes data 7D.

The "delivery target" indicates attributes of the listeners 38 to whom the subject subsidiary material 6B is to be delivered. As described earlier, for each of the first limited material, the second limited material, and the no-limit material, how the content thereof is to be shown to each of the specific listener and the non-specific listeners is determined in advance. Where the subsidiary material 6B corresponds to the first limited material, the delivery target indicates "attributes-specific". Where the subsidiary material 6B corresponds to the second limited material, the delivery target indicates "specific listener". Where the subsidiary material 6B corresponds to the no-limit material, the delivery target indicates "all listeners".

The "identification code" is to identify a file 7B for the subsidiary material 6B. The "file name" is the name of the subject file 7B. The file name is used to differentiate the subject file 7B from other files in the subsidiary material storage portion 101.

As mentioned above, however, two subsidiary materials 6B are prepared for the first limited material. In view of this, where the subsidiary material 6B corresponds to the first limited material, a code and a file name of the file 7B for the specific listener are indicated as the identification code and the file name, respectively, and a code and a file name of the file 7B for the non-specific listener are indicated as a "second identification code" and a "second file name", respectively.

In the meantime, when a specific page 6AP is displayed during a presentation, the speaker 28 sometimes wishes the listeners 38 to refer to a specific subsidiary material 6B. In such a case, in preparing the main material 6A before the presentation, the speaker 28 performs operation to correlate the specific page 6AP with the specific subsidiary material 6B. In this embodiment, the speaker 28 enters a page number of the page 6AP and a material code of the subsidiary material 6B.

Where there are a plurality of combinations of a specific page 6AP and a specific subsidiary material 6B to be referred to, the speaker 28 enters a page number of the specific page 6AP and a material code of the specific subsidiary material 6B for each of the combinations.

The data indicating the page number and material code thus entered is stored as the reference data 7A2 into the main material storage portion 201 as shown in FIG. 10.

[Processing During Presentation]

Figure 11:
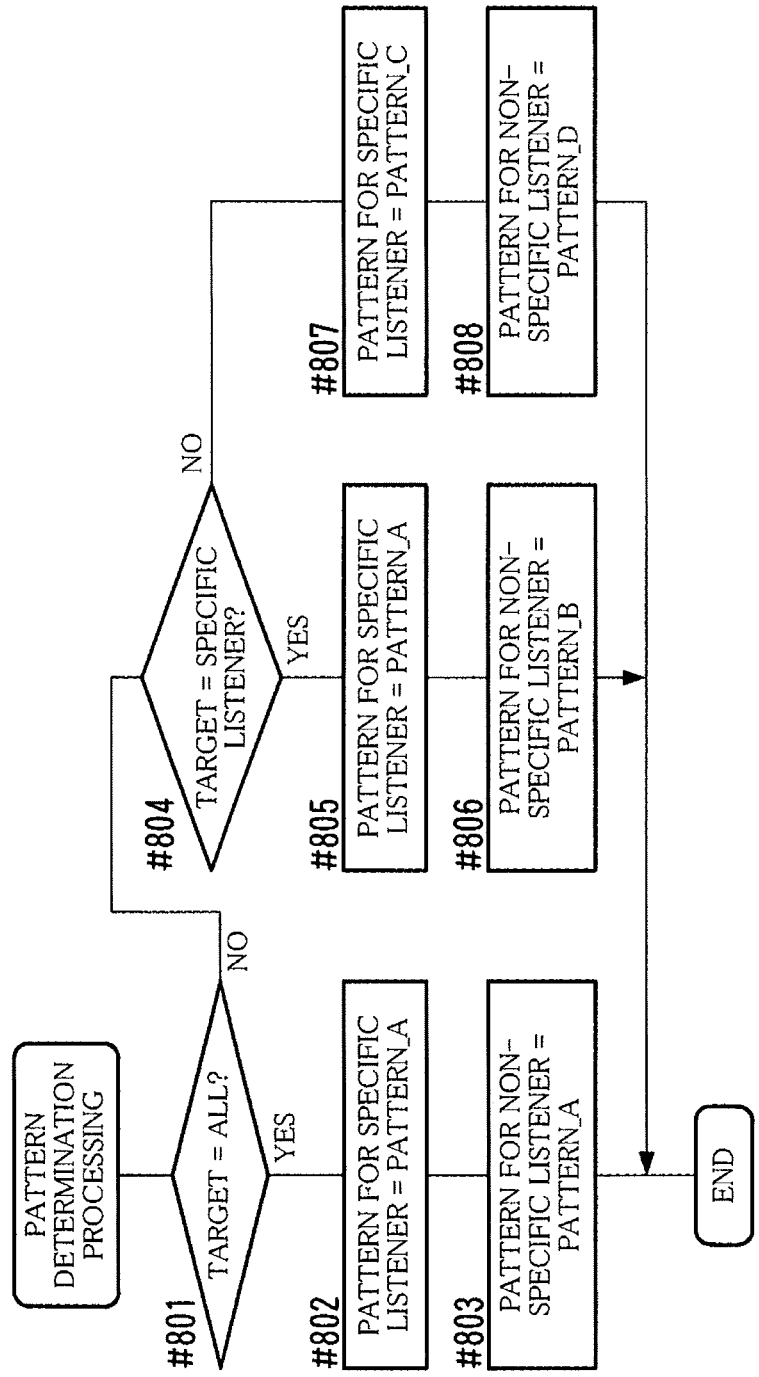
FIG. 11 is a flowchart depicting an example of the flow of pattern determination processing.
Figure 13A:
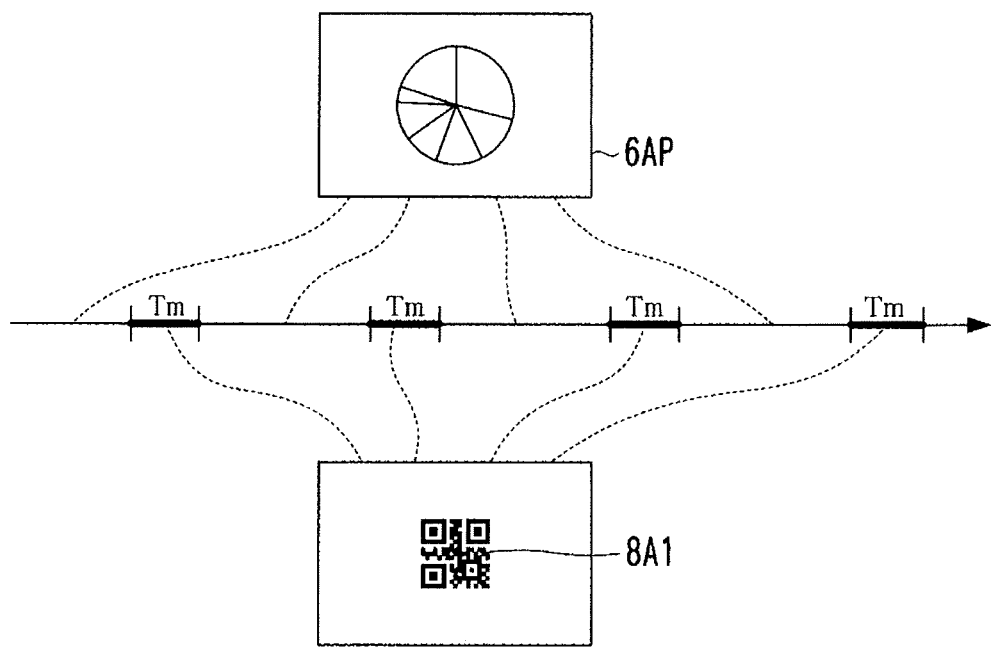
FIGS. 13A and 13B are diagrams showing examples of a transition of an image displayed by a projector.
Figure 13B:
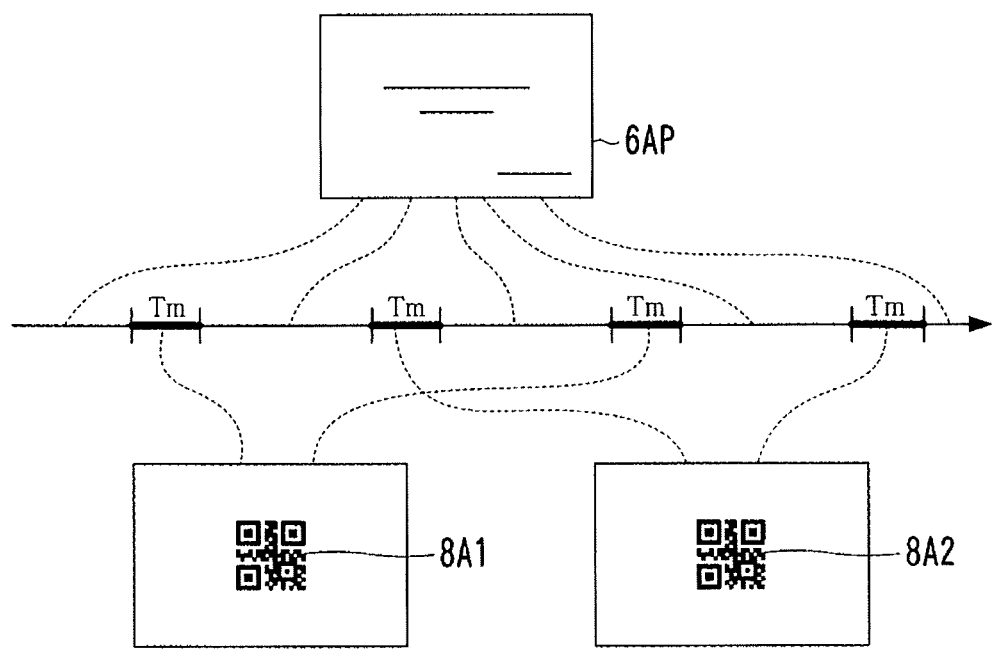
Figure 14:
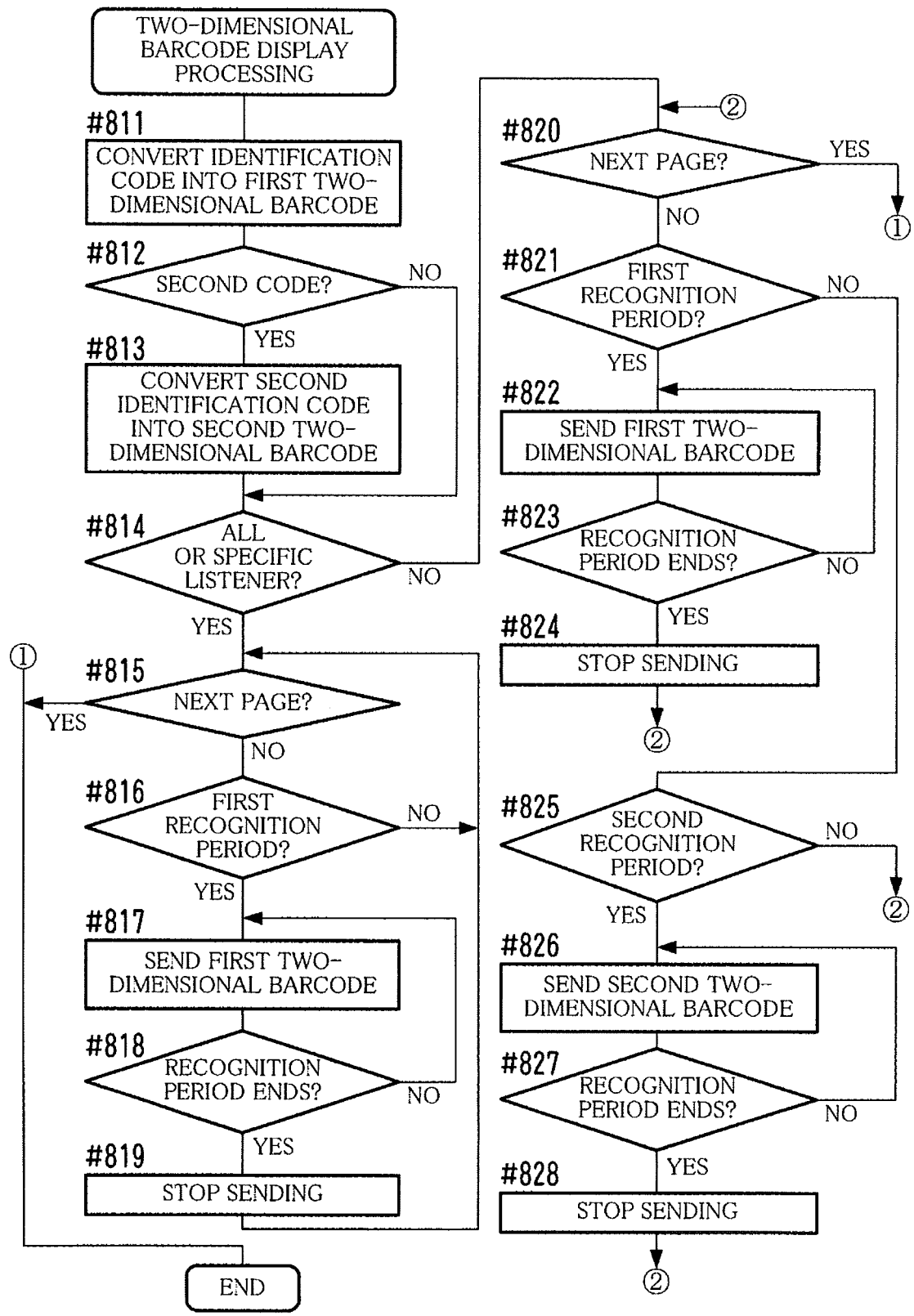
FIG. 14 is a flowchart depicting an example of the flow of two-dimensional barcode display processing.
Figure 15:
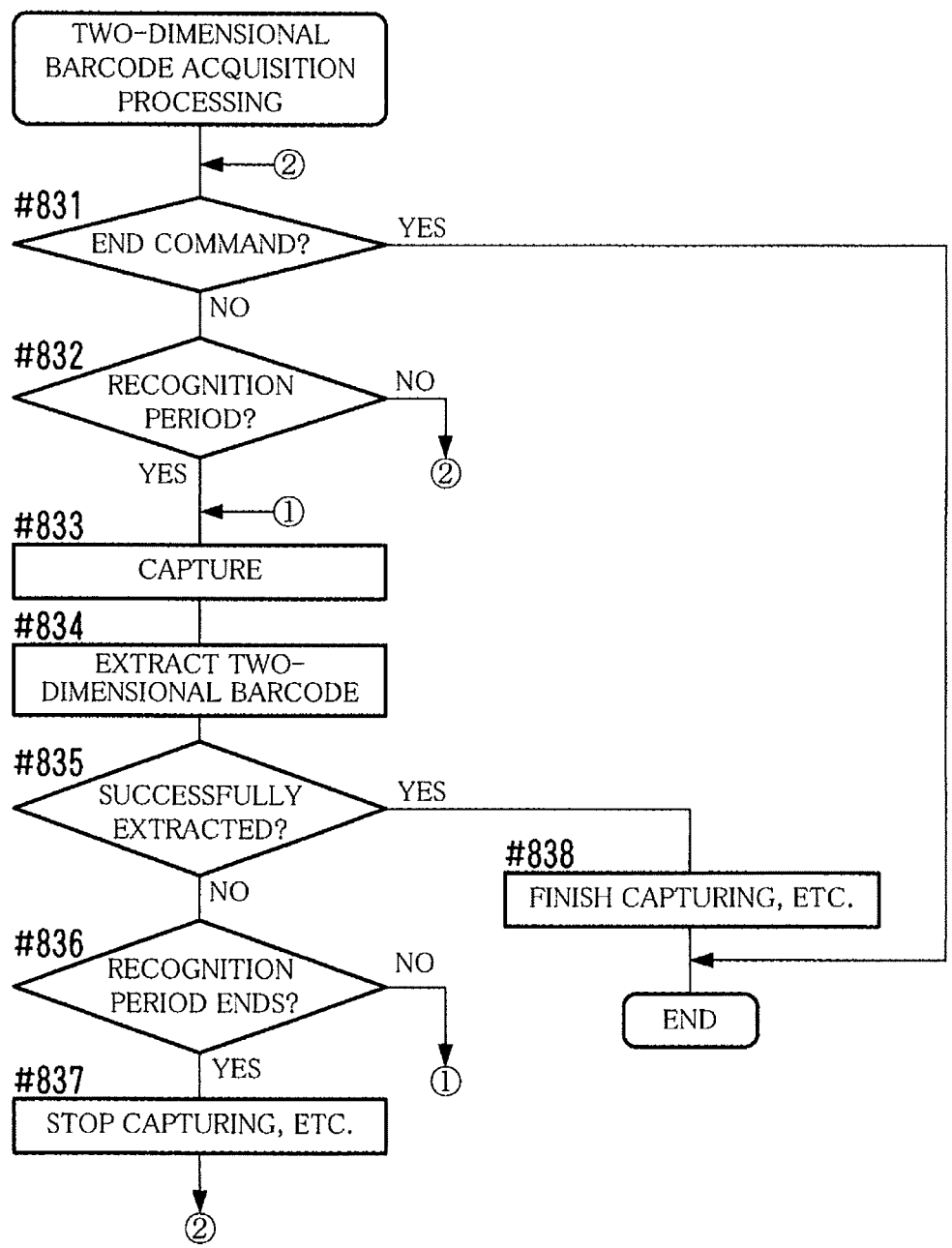
FIG. 15 is a flowchart depicting an example of the flow of two-dimensional barcode acquisition processing.

FIG. 11 is a flowchart depicting an example of the flow of pattern determination processing. FIGS. 12A-12D are diagrams showing examples of a recognition period pattern. FIGS. 13A and 13B are diagrams showing examples of a transition of an image displayed by the projector 41. FIG. 14 is a flowchart depicting an example of the flow of two-dimensional barcode display processing. FIG. 15 is a flowchart depicting an example of the flow of two-dimensional barcode acquisition processing.

The speaker 28 places the projector 41 and the main terminal 2 in a room where a presentation is to be made (meeting room, for example), and turns on the projector 41 and the main terminal 2. The speaker 28 then connects the projector 41 and the main terminal 2 to the communication line 5 to run the presentation program 20P in the main terminal 2.

The listeners 38 carry their own subsidiary terminals 3 to the room and turn on the subsidiary terminals 3. The listeners 38 then connect their own subsidiary terminals 3 to the communication line 5 to launch the material viewer program 30P.

The speaker 28 then uses the presentation program 20P to open a file 7A.

With the main terminal 2, the main material display portion 204 starts sending image data on Page 1, namely, the page 6AP1, to the projector 41 based on display data 7A1 for the file 7A. The projector 41 receives the image data and displays the page 6AP1 based on the image data in the projector screen.

Every time the speaker 28 performs predetermined operation, e.g., presses a next page button, the main material display portion 204 stops sending the image data on the page 6AP which is currently displayed (hereinafter, referred to as the "current page") and sends image data on the next page 6AP to the projector 41.

In response to the image data received, the projector 41 displays the next page 6AP based on the image data received in the projector screen. This changes the current page.

As described earlier, while a certain page 6AP is displayed as the current page, the speaker 28 may prompt the listeners 38 to refer to a subsidiary material 6B corresponding to the page 6AP.

At this time, the speaker 28 performs predetermined operation, e.g., presses a subsidiary material reference button, to enter a command to display a two-dimensional barcode.

In performing the predetermined operation, the speaker 28 asks all of the listeners 38 to photograph the projector screen. It is noted that the speaker 28 asks only the specific listener to photograph the projector screen when the subsidiary material 6B corresponds to the second limited material.

The timing determination portion 205 then determines a time at which the subsidiary terminals 3 start photographing (hereinafter, referred to as a "start time P0") and a pattern of a period of time during which the two-dimensional barcode is recognized (hereinafter, referred to as a "recognition period pattern 8S") in the following manner.

The timing determination portion 205 determines that the start time P0 is a time at which a preset time has elapsed since the command was entered. The start time P0 is an absolute time. For example, if the time at which the command has been entered is "eleven thirty, fifteen seconds, and 20 milliseconds (11:30 a.m., 15:20)", and the preset time is "seven seconds", then the timing determination portion 205 determines that the start time P0 is "eleven thirty, twenty-two seconds, and 20 milliseconds (11:30 a.m., 22:20)".

The timing determination portion 205 then determines the recognition period pattern 8S based on the reference data 7A2 for the subsidiary material 6B. The recognition period pattern 8S is sometimes different for each of the subsidiary terminals 3 of the specific listeners and each of the subsidiary terminals 3 of the non-specific listeners. Hereinafter, the recognition period pattern 8S in the subsidiary terminal 3 of the specific listener is referred to as a "first pattern 8S1" and the recognition period pattern 8S in the subsidiary terminal 3 of the non-specific listener is referred to as a "second pattern 8S2".

The description goes on to a method for determining each of the first pattern 8S1 and the second pattern 8S2. The description is given with reference to the flowchart of FIG. 11.

Where the subsidiary material attributes data 7D corresponding to the material code of the reference data 7A2 indicates "all listeners" as the delivery target (YES in Step #801 of FIG. 11), the timing determination portion 205 determines that both the first pattern 8S1 and the second pattern 8S2a correspond to a pattern_A (Steps #802 and #803).

Figure 12A:
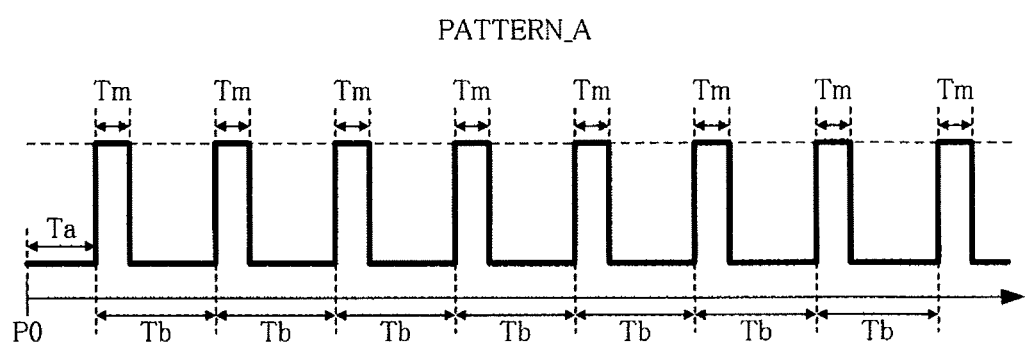
FIGS. 12A-12D are diagrams showing examples of a recognition period pattern.

As shown in FIG. 12A, the pattern_A is a pattern in which a recognition period corresponds to a period of time Tm that comes every time Tb after the lapse of time Ta since the start time P0.

Alternatively, where the subsidiary material attributes data 7D corresponding to the material code of the reference data 7A2 indicates "specific listener" as the delivery target (NO in Step #801 and YES in Step #804), the timing determination portion 205 determines that the first pattern 8S1 corresponds to the pattern_A (Step #805) and the second pattern 8S2 corresponds to a pattern_B (Step #806).

Figure 12B:
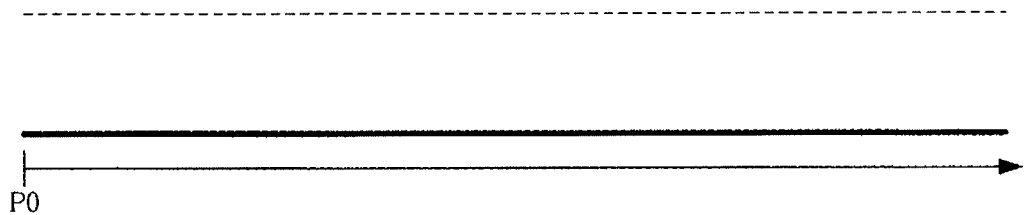

As shown in FIG. 12B, the pattern_B is a pattern in which no recognition period is provided.

Alternatively, where the subsidiary material attributes data 7D corresponding to the material code of the reference data 7A2 indicates "attributes-specific" as the delivery target (NO in Step #801 and NO in Step #804), the timing determination portion 205 determines that the first pattern 8S1 corresponds to a pattern_C (Step #807) and the second pattern 8S2 corresponds to a pattern_D (Step #808).

Figure 12C:
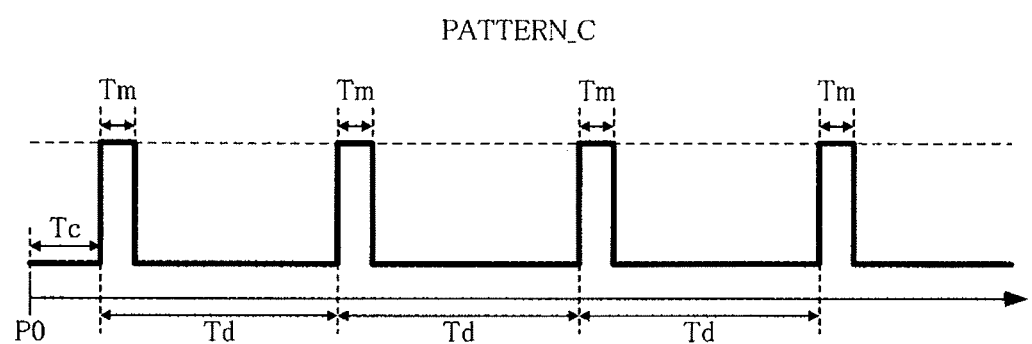
Figure 12D:
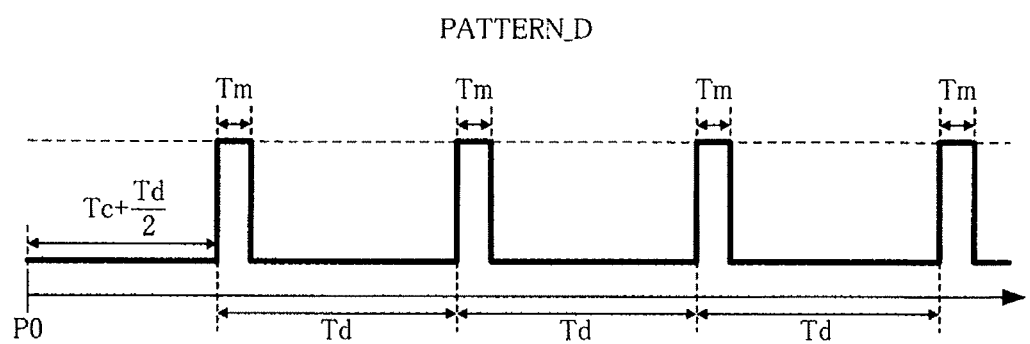

As shown in FIG. 12C, the pattern_C is a pattern in which a recognition period corresponds to a period of time Tm that comes every time Td after the lapse of time Tc since the start time P0. As shown in FIG. 12D, the pattern_D is a pattern in which a recognition period corresponds to a period of time Tm that comes every time Td after the lapse of time (Tc+Td/2) since the start time P0.

The time Ta, Tb, Tc, and Td is a few seconds each. For example, the time Ta and the time Tc are one to five seconds each; the time Tb is three to ten seconds; and the time Tb is six to ten seconds.

The time Tm is shorter than each of the time Ta, Tb, Tc, and Td. The time Tm is 0.1 to 2.0 seconds, for example. It is desirable that the time Tm has a length enough for the digital camera 30h to adjust the focus of a lens on the two-dimensional barcode.

When the timing determination portion 205 determines the start time P0, the first pattern 8S1, and the second pattern 8S2, the timing notifying portion 206 sends first timing data 7E1 to the subsidiary terminal 3 of the specific listener and sends second timing data 7E2 to the subsidiary terminals 3 of the non-specific listeners. The first timing data 7E1 indicates the start time P0 and the first pattern 8S1. The second timing data 7E2 indicates the start time P0 and the second pattern 8S2.

The subsidiary terminal 3 of the specific listener and the subsidiary terminals 3 of the non-specific listeners are identifiable based on the listener data 7C (see FIG. 8). To be specific, the subsidiary terminal 3 of the specific listener is the subsidiary terminal 3 corresponding to the listener data 7C which indicates "full" in the access right. The subsidiary terminals 3 of the non-specific listeners are the subsidiary terminals 3 corresponding to the listener data 7C which indicates "some" in the access right.

When the timing determination portion 205 determines the start time P0, the first pattern 8S1, and the second pattern 8S2, the two-dimensional barcode display portion 207 performs processing for displaying a two-dimensional barcode based on the reference data 7A2 on the current page and the subsidiary material attributes data 7D (see FIG. 9) on the subsidiary material 6B corresponding to the current page. The processing is executed in the steps as depicted in FIG. 14.

The two-dimensional barcode display portion 207 generates, based on the subsidiary material attributes data 7D, a two-dimensional barcode that indicates information used to download the subsidiary material 6B from the material server 1 (Step #811 of FIG. 14).

The information for download is, for example, a Uniform Resource Locator (URL). Suppose that the domain name of the material server 1 is "www.example.com"; the name of the subsidiary material storage portion 101 is "folder-x"; the file name "list.doc" is indicated in the subsidiary material attributes data 7D. In such a case, the two-dimensional barcode display portion 207 generates a two-dimensional barcode which indicates a URL "http://www.example.com/folder-x/list.doc". The case is described below in which the URL is used as the information used to download the subsidiary material 6B If the subsidiary material attributes data 7D indicates a second file name (YES in Step #812), then the two-dimensional barcode display portion 207 generates a two-dimensional barcode which indicates an URL including the second file name instead of the file name (Step #813).

Hereinafter, the two-dimensional barcode generated in Step #811 is referred to as a "first two-dimensional barcode 8A1" and the two-dimensional barcode generated in Step #813 is referred to as a "second two-dimensional barcode 8A2". The format of each of the first two-dimensional barcode 8A1 and the second two-dimensional barcode 8A2 may be a known format such as a Quick Response (QR) code or a color code.

If the subsidiary material attributes data 7D corresponding to the material code of the reference data 7A2 indicates "all listeners" or "specific listener" as the delivery target (YES in Step #814), then the two-dimensional barcode display portion 207 transmits image data on the first two-dimensional barcode 8A1 instead of the image data on the current page to the projector 41 (Step #817) during a period corresponding to the first pattern 8S1 (YES in Step #816 and NO in Step #818). The transmission is made in an interval from when the current time reaches the start time P0 to when operation for changing the current page such as pressing the next page button is performed (NO in Step #815). After the elapse of the period corresponding to the first pattern 8S1 (YES in Step #818), the two-dimensional barcode display portion 207 stops sending the image data on the first two-dimensional barcode 8A1 (Step #819). The main material display portion 204 then sends the image data on the current page to the projector 41.

Where the delivery target indicates "all listeners" or "specific listener", the first pattern 8S1 is determined to be the pattern_A as described above. In such a case, the main material display portion 204 and the two-dimensional barcode display portion 207 perform the processing. Then, as shown in FIG. 12A, after the lapse of time Ta from the start time P0, the image data on the first two-dimensional barcode 8A1 is sent, only during the period of time Tm, to the projector 41 every time Tb. During the other periods of time, the image data on the current page is sent to the projector 41.

This enables displaying, only for the period of time Tm, the first two-dimensional barcode 8A1 instead of the current page at constant intervals as shown in FIG. 13A.

If the subsidiary material attributes data 7D corresponding to the material code of the reference data 7A2 indicates "attributes-specific" as the delivery target (NO in Step #814), then the two-dimensional barcode display portion 207 transmits the image data on the first two-dimensional barcode 8A1 instead of the image data on the current page to the projector 41 (Step #822) during the period corresponding to the first pattern 8S1 (YES in Step #821 and NO in Step #823). The transmission is made in an interval from when the current time reaches the start time P0 to when operation for changing the current page is performed (NO in Step #820). After the elapse of the period corresponding to the first pattern 8S1 (YES in Step #823), the two-dimensional barcode display portion 207 stops sending the image data on the first two-dimensional barcode 8A1 (Step #824). The main material display portion 204 then starts sending the image data on the current page to the projector 41.

Before the operation, the two-dimensional barcode display portion 207 transmits image data on the second two-dimensional barcode 8A2 instead of the image data on the current page to the projector 41 (Step #826) during a period corresponding to the second pattern 8S2 (YES in Step #825 and NO in Step #827). After the elapse of the period corresponding to the second pattern 8S2 (YES in Step #827), the two-dimensional barcode display portion 207 stops sending the image data on the second two-dimensional barcode 8A2 (Step #828). The main material display portion 204 then starts sending the image data on the current page to the projector 41.

Where the delivery target indicates "attributes-specific", the first pattern 8S1 is determined to be the pattern_C and the second pattern 8S2 is determined to be the pattern_D as described above. In such a case, the main material display portion 204 and the two-dimensional barcode display portion 207 perform the processing. Then, as shown in FIG. 12C, after the lapse of time Tc from the start time P0, the image data on the first two-dimensional barcode 8A1 is sent, only during the period of time Tm, to the projector 41 every time Td. Further, after the lapse of time (Tc+Td/2) from the start time P0, the image data on the second two-dimensional barcode 8A2 is sent, only during the period of time Tm, to the projector 41 every time Td. During a period of time other than both the periods of time, the image data on the current page is sent to the projector 41.

As shown in FIG. 13B, this enables displaying, only for the period of time Tm, the first two-dimensional barcode 8A1 and the second two-dimensional barcode 8A2 alternately instead of the current page at constant intervals.

In response to the current page changed, the photographing stop command portion 208 sends end command data 7F to each of the subsidiary terminals 3 to instruct the same to finish photographing.

In the meantime, each of the listeners 38 follows guidance by the speaker 28 to direct his/her subsidiary terminal 3 toward the projector screen to photograph the projector screen.

With each of the subsidiary terminals 3, the photographing start portion 301 (see FIG. 5) receives the first timing data 7E1 or the second timing data 7E2 from the main terminal 2 to cause the digital camera 30h to start photographing.

In response to the first timing data 7E1 or the second timing data 7E2 received, the image capturing portion 302 captures, as a target image 8B, an image shot by the digital camera 30h. The two-dimensional barcode extraction portion 303 then extracts a two-dimensional barcode from the target image 8B. The processing for capturing and extraction is executed in the steps as depicted in FIG. 15.

When the first timing data 7E1 is received, the image capturing portion 302 captures (Step #833), as the target image 8B, an image shot by the digital camera 30h from when the current time reaches the start time P0 indicated in the first timing data 7E1 to when the end command data 7F is sent from the main terminal 2 (NO in Step #831 of FIG. 15) during a period corresponding to the first pattern 8S1 indicated in the first timing data 7E1 (YES in Step #832 and NO in Step #836). It is noted that capturing is prohibited at a time other than the period corresponding to the first pattern 8S1.

To be specific, the target images 8B are captured one after another during the period corresponding to the first pattern 8S1. Every time the target image 8B is captured, the two-dimensional barcode extraction portion 303 attempts to extract a two-dimensional barcode from the target image 8B (Step #834).

When the two-dimensional barcode extraction portion 303 extracts the two-dimensional barcode successfully (YES in Step #835), the image capturing portion 302 and the two-dimensional barcode extraction portion 303 finish the processing for capturing and extraction (Step #838).

Alternatively, after the elapse of the period (YES in Step #836), the image capturing portion 302 and the two-dimensional barcode extraction portion 303 stop the capturing and extraction (Step #837), and wait for the time to reach the next period of time.

According to the processing depicted in FIG. 15, where the first timing data 7E1 indicates the pattern_A as the first pattern 8S1, as shown in FIG. 12A, the target image 8B is captured and extracting the two-dimensional barcode is attempted, only for the period of time Tm, every time Tb after the lapse of time Ta from the start time P0. Since no target image 8B is captured in a time other than the period of time Tm, no two-dimensional barcodes can be extracted.

Where the first timing data 7E1 indicates the pattern_C as the first pattern 8S1, as shown in FIG. 12C, the target image 8B is captured and extracting the two-dimensional barcode is attempted, only for the period of time Tm, every time Td after the lapse of time Tc from the start time P0. Since no target image 8B is captured in a time other than the period of time Tm, no two-dimensional barcodes can be extracted.

The flow of the processing for the case where the second timing data 7E2 is received is basically the same as that for the case where the first timing data 7E1 is received, which is shown in FIG. 15. However, the start time P0 indicated in the second timing data 7E2 is used as the start time P0, and, instead of the first pattern 8S1, the second pattern 8S2 indicated in the second timing data 7E2 is used.

According to the processing depicted in FIG. 15, where the second timing data 7E2 indicates the pattern_A as the second pattern 8S2, as shown in FIG. 12A, the target image 8B is captured and extracting the two-dimensional barcode is attempted, only for the period of time Tm, every time Tb after the lapse of time Ta from the start time P0. Since no target image 8B is captured in a time other than the period of time Tm, no two-dimensional barcodes can be extracted.

Where the second timing data 7E2 indicates the pattern_D as the second pattern 8S2, as shown in FIG. 12D, the target image 8B is captured and extracting the two-dimensional barcode is attempted, only for the period of time Tm, every time Td after the lapse of time (Tc+Td/2) from the start time P0. Since no target image 8B is captured in a time other than the period of time Tm, no two-dimensional barcodes can be extracted.

Where the second timing data 7E2 indicates the pattern_B as the second pattern 8S2, as shown in FIG. 12B, there is no period of time for capturing. No two-dimensional barcodes are thus extracted.

A two-dimensional barcode extracted in response to the first timing data 7E1 received is the first two-dimensional barcode 8A1. A two-dimensional barcode extracted in response to the second timing data 7E2 received is the second two-dimensional barcode 8A2.

The text recognition portion 304 decodes the two-dimensional barcode (the first two-dimensional barcode 8A1 or the second two-dimensional barcode 8A2) extracted by the two-dimensional barcode extraction portion 303 to obtain text data. In this way, text data indicating the URL is obtained.

The subsidiary material obtaining portion 305 obtains the file 7B based on the URL in the following manner. The subsidiary material obtaining portion 305 accesses the material server 1 based on the URL. The subsidiary material obtaining portion 305 then requests the file 7B identified by the URL from the material server 1.

With the material server 1, the subsidiary material delivery portion 102 retrieves the file 7B requested from the subsidiary material storage portion 101 to send the retrieved file 7B to the subsidiary terminal 3. The subsidiary material obtaining portion 305 then receives the file 7B.

The subsidiary material display portion 306 displays the subsidiary material 6B based on the file 7B in the touch-sensitive panel display 30$e$1.

Figure 16:
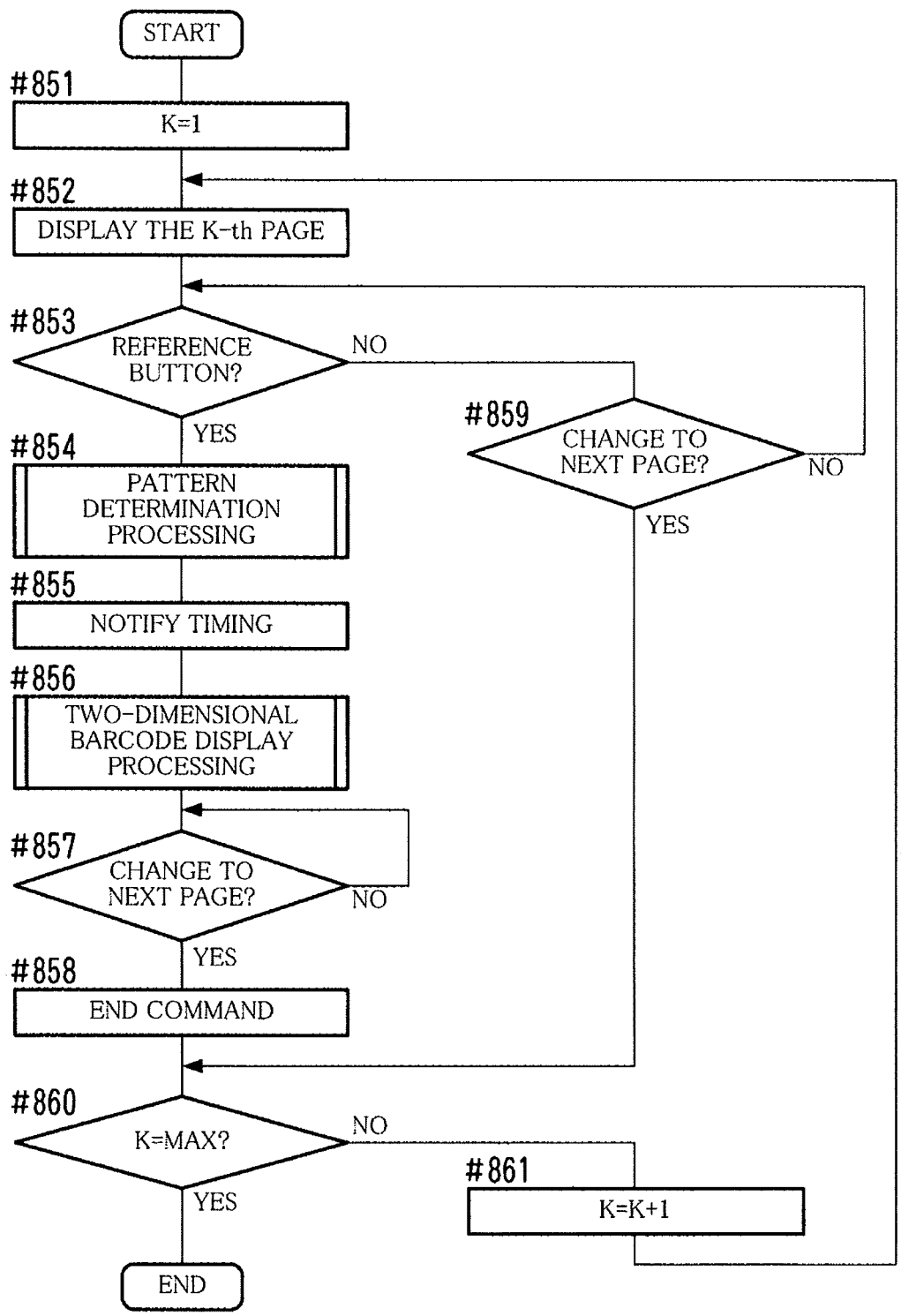
FIG. 16 is a flowchart depicting an example of the flow of the entire processing by a main terminal.
Figure 17:
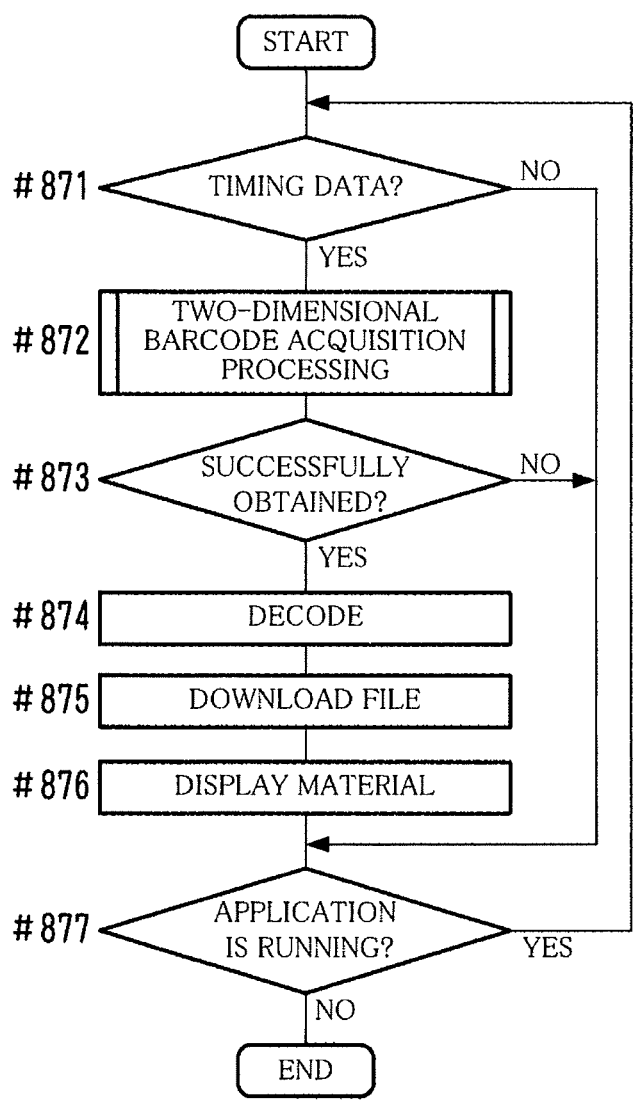
FIG. 17 is a flowchart depicting an example of the flow of the entire processing by a subsidiary terminal.

FIG. 16 is a flowchart depicting an example of the flow of the entire processing by the main terminal 2. FIG. 17 is a flowchart depicting an example of the flow of the entire processing by the subsidiary terminal 3.

The description goes on to the flow of the entire processing by each of the main terminal 2 and the subsidiary terminals 3. The description is given with reference to the flowcharts.

The main terminal 2 performs the processing based on the presentation program 20P in the steps as depicted in FIG. 16.

The main terminal 2 opens a file 7A and starts sending, to the projector 41, image data on Page 1 of a main material 6A, namely, image data on page 6AP1 (see FIG. 7), as the image data on the current page (Steps #851 and #852 of FIG. 16).

Where the subsidiary material reference button is pressed or the like to enter a command to display a two-dimensional barcode (YES in Step #853), the main terminal 2 determines a pattern of period during which the two-dimensional barcode is displayed (recognition period pattern 8S) and a time at which to start displaying the two-dimensional barcode (start time P0) (Step #854). The determination processing is performed in the steps of FIG. 11.

The main terminal 2 then performs processing for notifying the subsidiary terminals 3 of the start time P0 and recognition period pattern 8S (first pattern 8S1 or second pattern 8S2) thus determined (Step #855), and processing for displaying the two-dimensional barcode (Step #856).

The main terminal 2 performs the notification processing by sending the first timing data 7E1 to the subsidiary terminal 3 of the specific listener and sending the second timing data 7E2 to the subsidiary terminals 3 of the non-specific listeners. The processing for displaying the two-dimensional barcode is performed in the steps depicted in FIG. 14.

When a command to change the current page to the next page is entered (YES in Step #857), the main terminal 2 sends the end command data 7F to the subsidiary terminals 3 (Step #858), and starts sending, to the projector 41, image data on the next page as the image data on the current page (Step #861 and Step #852) unless the current page is the final page (NO in Step #860).

Where a command to change the current page to the next page is entered (YES in Step #859) without entry of a command to display a two-dimensional barcode (NO in Step #853), the main terminal 2 starts sending, to the projector 41, the image data on the next page as the image data on the current page (Step #861 and Step #852) unless the current page is the final page (NO in Step #860). The main terminal 2, however, sends no end command data 7F.

On the other hand, the subsidiary terminal 3 performs the processing based on the material viewer program 30P in the steps as depicted in FIG. 17.

When receiving the first timing data 7E1 or the second timing data 7E2 (YES in Step #871 of FIG. 17), the subsidiary terminal 3 performs processing for extracting the two-dimensional barcode (first two-dimensional barcode 8A1 or second two-dimensional barcode 8A2) (Step #872). The processing steps are described earlier with reference to FIG. 15.

When extracting the two-dimensional barcode successfully (YES in Step #873), the subsidiary terminal 3 decodes the two-dimensional barcode to acquire text data (Step #874) and obtains (downloads) a file 7B from the material server 1 based on an URL indicated in the text data (Step #875). The subsidiary terminal 3 then displays the subsidiary material 6B based on the file 7B (Step #876).

While the presentation program 20P is running (YES in Step #877), the subsidiary terminal 3 performs the processing of Steps #871 to #876 appropriately.

In this embodiment, it is possible to deliver a material such as the subsidiary material 6B to attendees, e.g., the listeners 38, according to the attributes thereof more easily than is conventionally possible.

Figure 18A:
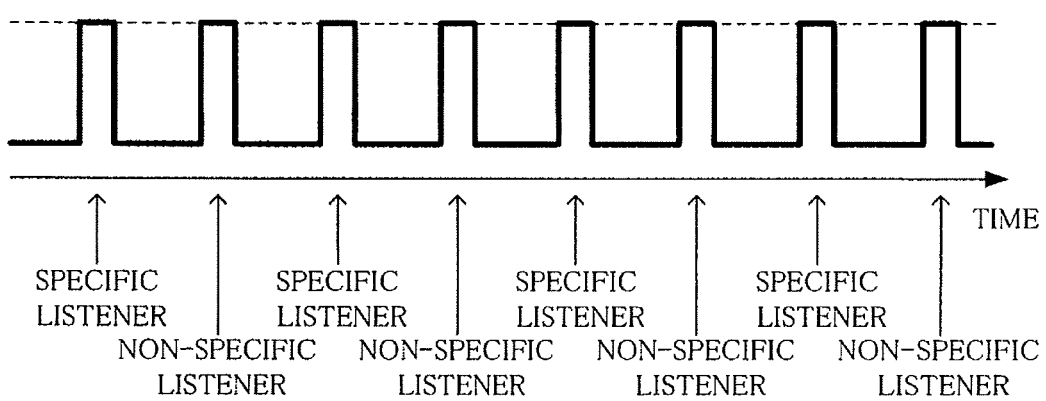
FIGS. 18A-18C are timing charts depicting examples of a time at which a specific listener and a non-specific listener each photographs with a subsidiary terminal.
Figure 18B:
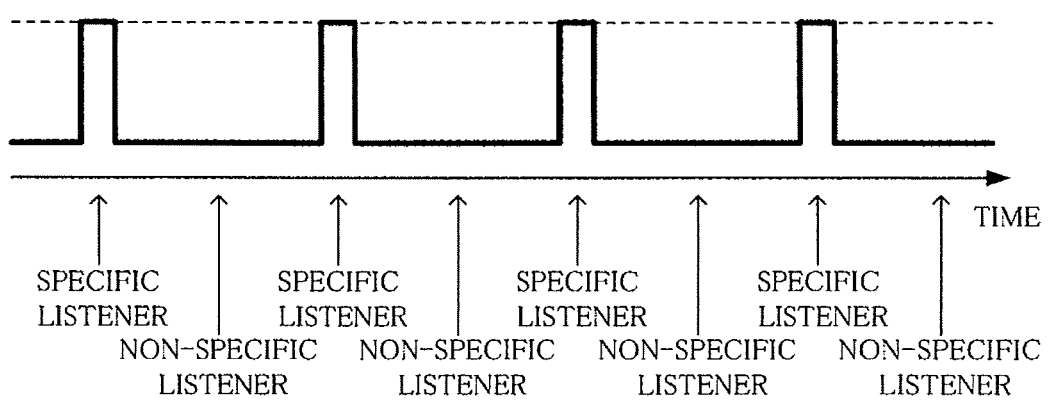
Figure 18C:
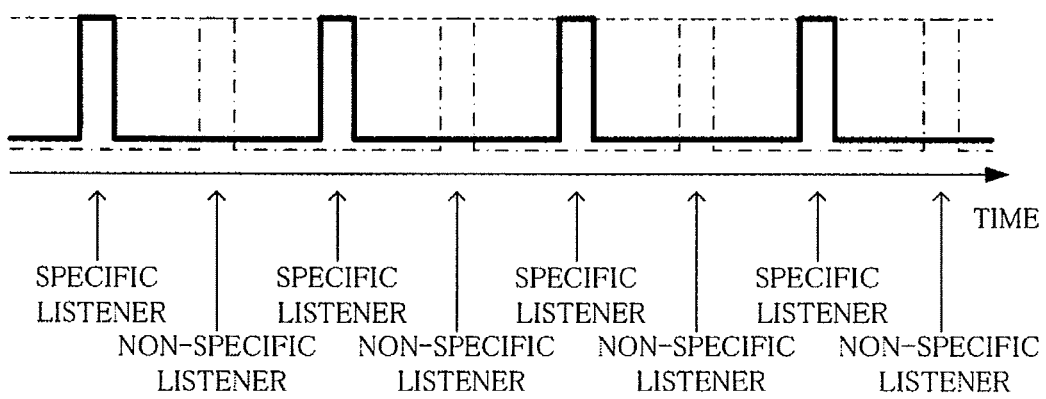
Figure 20A:
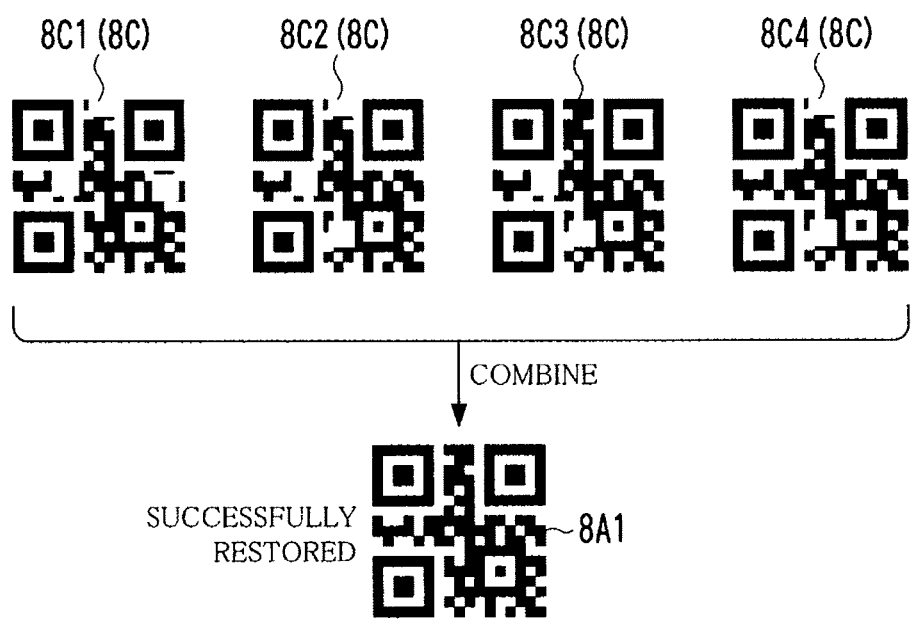
FIGS. 20A and 20B are diagrams showing examples of restoration of a first two-dimensional barcode.
Figure 20B:
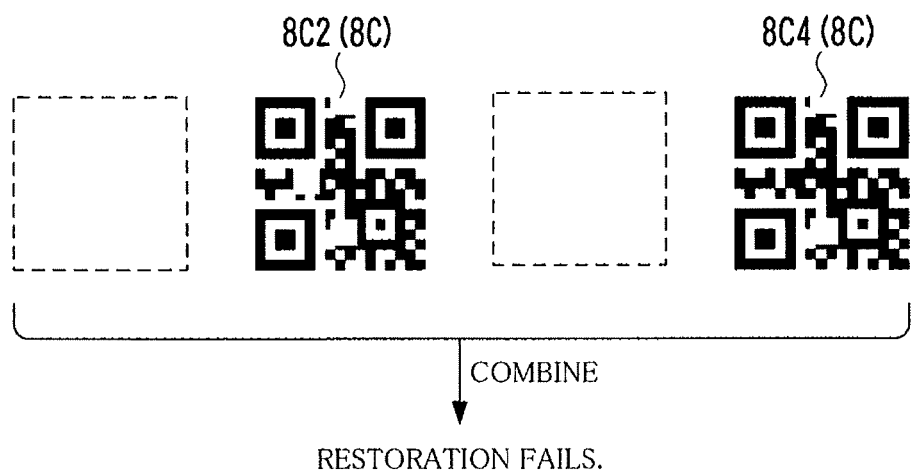

FIGS. 18A-18C are timing charts depicting examples of a time at which a specific listener and a non-specific listener each photographs with his/her subsidiary terminal 3. FIG. 19 is a timing chart depicting a modified example of a time at which a specific listener and a non-specific listener each photographs with his/her subsidiary terminal 3. FIGS. 20A and 20B are diagrams showing examples of restoration of the first two-dimensional barcode 8A1. FIGS. 21A-21D are timing charts depicting examples of a time of recognition and display when the three files 7A are distributed selectively.

In this embodiment, the timing determination portion 205 of the main terminal 2 determines the first pattern 8S1 and the second pattern 8S2 depending on the type of the subsidiary material 6B, namely, depending on whether the subsidiary material 6B is the first limited material, the second limited material, or the no-limit material. The timing notifying portion 206 notifies the subsidiary terminal 3 of the specific listener of the start time P0 and the first pattern 8S1, and notifies the subsidiary terminals 3 of the non-specific listeners of the start time P0 and the second pattern 8S2.

Instead of this, however, another arrangement is possible. To be specific, the first pattern 8S1 and the second pattern 8S2 are predefined in a fixed manner, the timing determination portion 205 determines the start time P0 only, and the timing notifying portion 206 informs the subsidiary terminals 3 of the start time P0 only. In such a case, the main terminal 2 and the subsidiary terminal 3 are required to perform the processing in the following manner.

For example, in the subsidiary terminal 3 of the specific listener, the pattern_C shown in FIG. 12C is defined as the first pattern 8S1 in a fixed manner. In the subsidiary terminals 3 of the non-specific listeners, the pattern_D shown in FIG. 12D is defined as the second pattern 8S2 in a fixed manner.

If the subsidiary material 6B corresponding to the current page is the no-limit material, in other words, if the delivery target is "all listeners", then the two-dimensional barcode display portion 207 sends, to the projector 41, the image data on the first two-dimensional barcode 8A1 at a timing as shown in the pattern_A of FIG. 12A. This allows the specific listener and the non-specific listeners to capture the first two-dimensional barcode 8A1 as shown in FIG. 18A.

Alternatively, if the subsidiary material 6B corresponding to the current page is the second limited material, in other words, if the delivery target is "some", then the two-dimensional barcode display portion 207 sends, to the projector 41, the image data on the first two-dimensional barcode 8A1 at a timing as shown in the pattern_C of FIG. 12C. This allows the specific listener to capture the first two-dimensional barcode 8A1; however does not allow any of the non-specifics listener to capture the first two-dimensional barcode 8A1 as shown in FIG. 18B.

Alternatively, if the subsidiary material 6B corresponding to the current page is the first limited material, in other words, if the delivery target is "attributes-specific", then the two-dimensional barcode display portion 207 sends, to the projector 41, the image data on the first two-dimensional barcode 8A1 at a timing as shown in the pattern_C of FIG. 12C, and sends, to the projector 41, the image data on the second two-dimensional barcode 8A2 at a timing as shown in the pattern_D of FIG. 12D. This allows: the specific listener to capture, among the first two-dimensional barcode 8A1 (corresponding to the thick solid line of FIG. 18C) and the second two-dimensional barcode 8A2 (corresponding to the dot-dash line), only the first two-dimensional barcode 8A1; and the non-specific listeners to capture only the second two-dimensional barcode 8A2 as shown in FIG. 18C.

If the subsidiary material 6B corresponding to the current page is the first limited material, then the main terminal 2 and the subsidiary terminal 3 may perform the processing in the following manner.

The timing determination portion 205 determines that the first pattern 8S1 is the pattern_A and notifies the subsidiary terminal 3 of the specific listener that the first pattern 8S1 is the pattern_A. The timing determination portion 205 determines that the second pattern 8S2 is the pattern_D and notifies the subsidiary terminals 3 of the non-specific listeners that the second pattern 8S2 is the pattern_D.

The two-dimensional barcode display portion 207 generates even number of two-dimensional barcode pieces 8C each of which corresponds to a part of the first two-dimensional barcode 8A1. After the current time reaches the start time P0, the two-dimensional barcode display portion 207 causes the projector 41 to display, at the timing shown as the pattern_A, the two-dimensional barcode pieces 8C one by one repeatedly.

For example, as shown in FIG. 19, the two-dimensional barcode display portion 207 displays four two-dimensional barcode pieces 8C1-8C4 one by one in order repeatedly.

In the meantime, overlapping the two-dimensional barcode pieces 8C1-8C4 results in the first two-dimensional barcode 8A1. Stated differently, any part of the first two-dimensional barcode 8A1 is always seen in at least one of the two-dimensional barcode pieces 8C1-8C4.

In order for the subsidiary terminal 3 to obtain the reference position for overlapping, it is desirable to generate the two-dimensional barcode pieces 8C in a manner to prevent three position detection patterns (black squares) from lacking.

However, even if all of the even-numbered two-dimensional barcode pieces 8C are overlapped with one another, specifically in FIG. 19, even if the two-dimensional barcode pieces 8C2 and 8C4 are overlapped with each other, the first two-dimensional barcode 8A1 cannot be restored. It is desirable to set an error correction level of the first two-dimensional barcode 8A1 at a low level in order to prevent text data from being decoded with a part of the first two-dimensional barcode 8A1 lacked. For example, it is desirable to set the error correction level at L (7%).

With the subsidiary terminal 3 of the specific listener, the image capturing portion 302 captures, as the target images 8B, images photographed by the digital camera 30h one after another at the timing shown in the pattern_A. The two-dimensional barcode extraction portion 303 overlaps the target images 8B with one another to attempt to restore (reproduce) the first two-dimensional barcode 8A1.

This allows all of the two-dimensional barcode pieces 8C1-8C4 to be captured as shown in FIG. 20A, leading to restoration of the first two-dimensional barcode 8A1.

On the other hand, with each of the subsidiary terminals 3 of the non-specific listeners, the image capturing portion 302 captures, as the target images 8B, images photographed by the digital camera 30h one after another at the timing shown in the pattern_D. The two-dimensional barcode extraction portion 303 overlaps the target images 8B with one another to attempt to restore the first two-dimensional barcode 8A1.

However, as shown in FIG. 20B, only the two-dimensional barcode pieces 8C2 and 8C4 of the two-dimensional barcode pieces 8C1-8C4 can be captured. The two-dimensional barcode extraction portion 303 thus cannot restore the first two-dimensional barcode 8A1.

In this embodiment, as the first two-dimensional barcode 8A1 and the second two-dimensional barcode 8A2, a two-dimensional barcode representing a URL of the file 7B is generated. Instead of this, however, it is possible to generate a two-dimensional barcode representing the identification code or the second identification code (see FIG. 9) of the file 7B.

In such a case, the subsidiary terminal 3 stores, in advance, a domain name of the material server 1 and a folder name of the subsidiary material storage portion 101. The subsidiary terminal 3 also stores, therein, the correspondence between the identification code or the second identification code of each of the files 7B and the file name of each of the files 7B. The subsidiary material obtaining portion 305 then downloads the file 7B based on these information pieces in the following manner.

When the first two-dimensional barcode 8A1 or the second two-dimensional barcode 8A2 is extracted and encoded to acquire text data, the subsidiary material obtaining portion 305 identifies a file name corresponding to the identification code or the second identification code indicated in the text data. The subsidiary material obtaining portion 305 then accesses the subsidiary material storage portion 101 of the material server 1 to download a file 7B given the identified file name from the subsidiary material storage portion 101.

In this embodiment, where a certain page 6AP corresponds to the current page, the material server 1 provides the subsidiary terminal 3 of the specific listener with a file 7B having content given no limitation, and provides the subsidiary terminals 3 of the non-specific listeners with a file 7B having limited content. In short, the material server 1 selectively sends two files 7B having different contents depending on the attributes of the subsidiary terminals 3.

Instead of this, however, the material server 1 may selectively transmit three or more files 7B having different contents. A mechanism for the transmission is described below by taking an example in which three files 7B1-7B3 having different contents are sent.

The listeners 38 are classified into any one of first attributes, second attributes, and third attributes depending on departments which the listeners 38 work in.

Figure 21A:
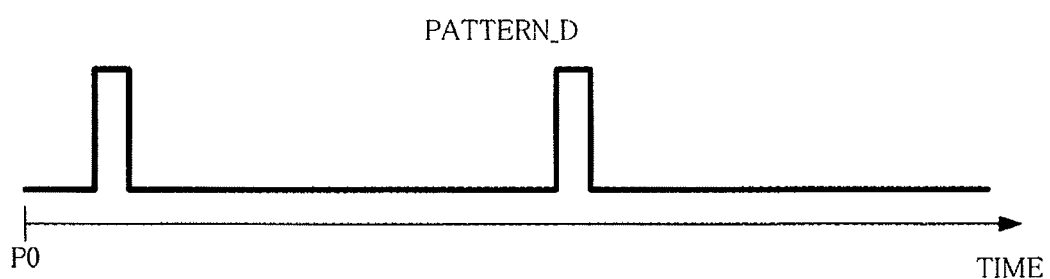
FIGS. 21A-21D are timing charts depicting examples of a time of recognition and display when three files are distributed selectively.
Figure 21B:
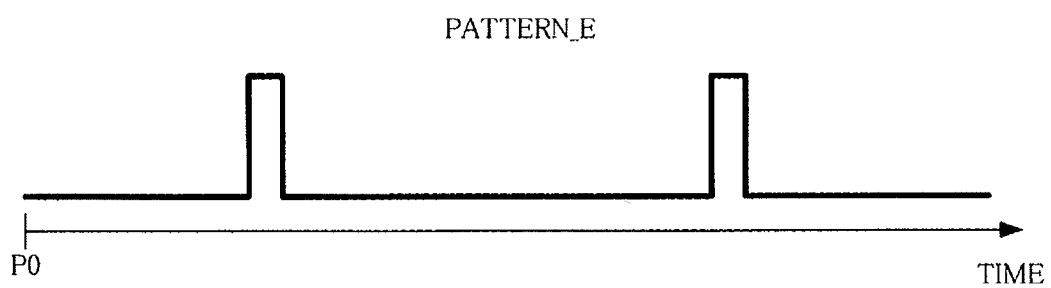
Figure 21C:
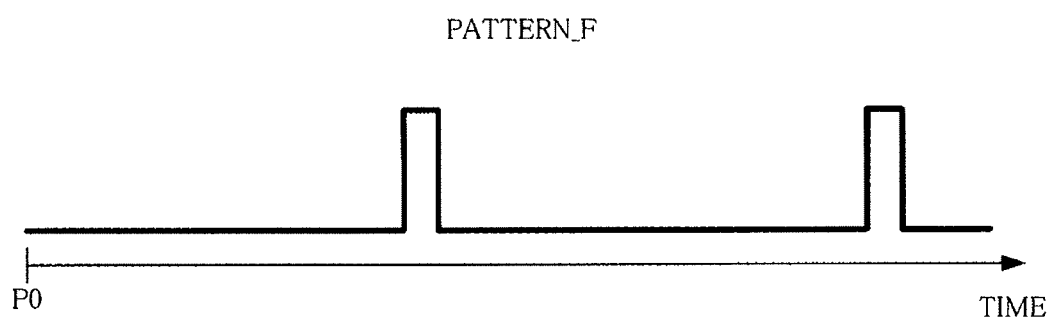

With the main terminal 2, the timing determination portion 205 determines that the recognition period patterns 8S of the subsidiary terminal 3 of the listener 38 who corresponds to the first attributes, the subsidiary terminal 3 of the listener 38 who corresponds to the second attributes, and the subsidiary terminal 3 of the listener 38 who corresponds to the third attributes are the pattern_D of FIG. 21A, the pattern_E of FIG. 21B, and the pattern_F of FIG. 21C, respectively.

The timing notifying portion 206 notifies each of the subsidiary terminals 3 of the start time P0 and the recognition period pattern 8S determined by the timing determination portion 205.

Figure 21D:
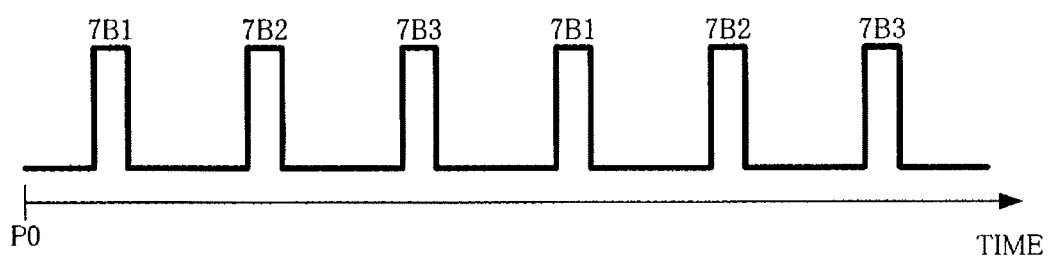

After the start time P0, the two-dimensional barcode display portion 207 sends, to the projector 41, image data on a two-dimensional barcode representing an URL of the file 7B1 at the timing shown in the pattern_D. The two-dimensional barcode display portion 207 sends, to the projector 41, image data on a two-dimensional barcode representing an URL of the file 7B2 at the timing shown in the pattern_E. The two-dimensional barcode display portion 207 sends, to the projector 41, image data on a two-dimensional barcode representing an URL of a file 7B3 at the timing shown in the pattern_F. This allows, as shown in FIG. 21D, the current page and the three two-dimensional barcodes to be displayed in order repeatedly.

With the subsidiary terminal 3 of the listener 38 who corresponds to the first attributes, the image capturing portion 302 captures, after the start time P0, an image photographed by the digital camera 30h as the target image 8B at the timing shown in the pattern_D. The two-dimensional barcode extraction portion 303 extracts a two-dimensional barcode from the target image 8B. This extracts only the two-dimensional barcode corresponding to the file 7B1. The subsidiary material obtaining portion 305 then downloads the file 7B1.

Similarly, with the subsidiary terminal 3 of the listener 38 who corresponds to the second attributes, the image capturing portion 302 captures an image photographed by the digital camera 30h as the target image 8B at the timing shown in the pattern_E. The two-dimensional barcode extraction portion 303 then extracts a two-dimensional barcode from the target image 8B. This extracts only the two-dimensional barcode corresponding to the file 7B2. The subsidiary material obtaining portion 305 then downloads the file 7B2.

Similarly, with the subsidiary terminal 3 of the listener 38 who corresponds to the third attributes, the image capturing portion 302 captures an image photographed by the digital camera 30h as the target image 8B at the timing shown in the pattern_F. The two-dimensional barcode extraction portion 303 then extracts a two-dimensional barcode from the target image 8B. This extracts only the two-dimensional barcode corresponding to the file 7B3. The subsidiary material obtaining portion 305 then downloads the file 7B3.

In this embodiment, when the file 7B is given to the listeners 38, a two-dimensional barcode representing a URL of the file 7B is displayed. Instead of such a two-dimensional barcode, a barcode representing the URL (so-called one-dimensional barcode) may be displayed. Instead of the URL, a barcode representing an identification code or a second identification code of the file 7B may be displayed.

In this embodiment, the main terminal 2 displays the main material 6A, the first two-dimensional barcode 8A1, and the second two-dimensional barcode 8A2 with the projector 41. Instead of the projector 41, a liquid crystal display or a plasma display may be used for display. Where the image forming apparatus 42 is provided with a large touch-sensitive panel display, such a touch-sensitive panel display may be used for display.

The main terminal 2 and the projector 41 may be configured as one device. For example, the projector 41 may be a projector which has an Operating System (OS) used in a personal computer or a tablet computer, namely, a so-called smart projector. In such a case, the projector 41 may execute the presentation program 20P thereon.

In this embodiment, the two-dimensional barcode display portion 207 generates the first two-dimensional barcode 8A1 or the second two-dimensional barcode 8A2 without encrypting a URL. Instead of this arrangement, it is also possible to generate a two-dimensional barcode representing an encrypted URL as the first two-dimensional barcode 8A1 or the second two-dimensional barcode 8A2. In such a case, a common decryption key is prepared in each of the subsidiary terminals 3. The two-dimensional barcode display portion 207 encrypts a URL so that the common decryption key can decrypt the URL. The two-dimensional barcode display portion 207 then generates a two-dimensional barcode representing the encrypted URL.

In this embodiment, until a command to change the current page to the next page is entered, the main terminal 2 displays a two-dimensional barcode at constant intervals and the subsidiary terminals 3 capture an image at constant intervals. Instead of this, the main terminal 2 may stop displaying and the subsidiary terminals 3 may stop capturing when a two-dimensional barcode is displayed at a predetermined number of times, even before the command is entered. Alternatively, the main terminal 2 may stop displaying and the subsidiary terminals 3 may stop capturing when a predetermined time has elapsed or when the speaker 28 performs predetermined operation.

It is to be understood that the overall configuration of the material display system 100, the material server 1, the main terminal 2, and the subsidiary terminals 3, the constituent elements thereof, the content of the processing, the order of the processing, the structure of the data, and the like may be appropriately modified without departing from the spirit of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image display system comprising:
  a display control device configured to control a display unit to display an image;
  a plurality of terminals; and
  a transmitter configured to transmit, to each of the plurality of terminals, respective timing data corresponding to respective specific periods of time, the timing data including different times indicating when different code images are displayed to the plurality of terminals; wherein
  each of the terminals includes
    a hardware processor configured to: extract, from an image displayed by the control device and photographed by the terminal during the respective specific period of time corresponding to the terminal of the hardware processor, a code image representing a code for identifying a material stored in a server; and obtain the code by decoding the code image, and a receiver configured to obtain a material from the server based on the code obtained by the hardware processor, the display control device includes a controller configured to control the display unit to display the code image, in a first terminal of the terminals, the specific period of time is a first period of time indicating only when a first code image is displayed by the display control device, in a second terminal of the terminals, the specific period of time is a second period of time indicating only when a second code image is displayed by the display control device and does not overlap the first period of time, and the controller controls the display unit to display a particular code image as the code image for the first period of time and to display a particular, different code image as the code image for the second period of time, each particular code image representing, as the code, a code for identifying a particular material fetched from the server by the terminals according to the first and second periods of time.

2. The system according to claim 1, wherein the first code image represents a first code for identifying a first particular material and the second code image represents a second code for identifying a second particular material.

3. The system according to claim 2, wherein the controller controls the display unit to display a main material primarily used in a presentation for a third period of time that overlaps neither of the first period of time and the second period of time.

4. The system according to claim 2, wherein the transmitter is configured to inform, among the terminals, the first terminal to which the particular material is to be provided of the first period of time, and to inform the second terminal to which the second particular material is to be provided of the second period of time.

5. The system according to claim 2, wherein
the first period of time is reached a plurality of times after a lapse of predetermined time, and
the second period of time is reached a plurality of times after the lapse of the predetermined time.

6. The system according to claim 2, wherein the first code image and the second code image are images representing the first code and the second code respectively in a form incomprehensible to a human being.

7. An image display system comprising:
a display control device configured to control a display unit to display an image;
a plurality of terminals; and
a transmitter configured to transmit, to each of the plurality of terminals, respective timing data corresponding to a respective specific periods of time, the timing data including different times indicating when different code images are displayed to the plurality of terminals; wherein
the display control device includes a controller configured to control the display unit to display a plurality of different parts of a code image according to a predetermined timing pattern of the timing data for the first period of time indicating only when a first code image is displayed by the display control device, and to display a particular, second different code image for the second period of time indicating only when a second part of a code image is displayed by the display control device, each particular code image representing a code for identifying a material stored in a server fetched from the server by the terminals according to the first and second periods of time, each of the terminals includes
a hardware processor configured to: obtain a combined code image by combining the plurality of different parts and the different code image displayed by the control device and photographed by a terminal during the respective specific period of time corresponding to the terminal of the hardware processor; and decode the combined code image to obtain a code, and a receiver configured to obtain a material from the server based on the code obtained by the hardware processor, in a first terminal of the terminals, the first period of time is set as the specific period of time, and in a second terminal of the terminals, a second period of time different from the first period of time and indicating only when a second code image is displayed by the display control device is set as the specific period of time.

8. The system according to claim 7, wherein the first code image represents a first code for identifying a first particular material and the second code image represents a second code for identifying a second particular material.

9. The system according to claim 8, wherein the controller controls the display unit to display a main material primarily used in a presentation for a third period of time that overlaps neither of the first period of time and the second period of time.

10. The system according to claim 8, wherein the transmitter is configured to inform, among the terminals, the first terminal to which the particular material is to be provided of the first period of time, and to inform the second terminal to which the second particular material is to be provided of the second period of time.

11. The system according to claim 8, wherein
the first period of time is reached a plurality of times after a lapse of predetermined time, and
the second period of time is reached a plurality of times after the lapse of the predetermined time.

12. The system according to claim 8, wherein the first code image and the second code image are images representing the first code and the second code respectively in a form incomprehensible to a human being.

13. A method of displaying images and obtaining material in an image display system, the image display system comprising a display control device configured to control a display unit to display an image, a plurality of terminals, and a transmitter configured to transmit, to each of the plurality of terminals, respective timing data corresponding to respective specific periods of time, the timing data including different times indicating when different code images are displayed to the plurality of terminals, wherein in a first terminal of the terminals, the specific period of time is a first period of time indicating only when a first code image is displayed by the display control device, and in a second terminal of the terminals, the specific period of time is a second period of time indicating only when a second code image is displayed by the display control device and does not overlap the first period of time, the method comprising:

extracting, by a hardware processor of a terminal of the plurality of terminals, from an image displayed by the control device and photographed by the terminal during the respective specific period of time corresponding to the terminal of the hardware processor, a code image representing a code for identifying a material stored in a server;

obtaining, by the hardware processor, the code by decoding the code image;

obtaining, by a receiver of the terminal, a material from the server based on the code obtained by the hardware processor; and controlling, by a controller of the display device, the display unit to display a particular code image as the code image for the first period of time and to display a particular, different code image as the code image for the second period of time, each particular code image representing, as the code, a code for identifying a particular material fetched from the server by the terminals according to the first and second periods of time.

14. A method of displaying images and obtaining material in an image display system, the image display system comprising a display control device configured to control a display unit to display an image, a plurality of terminals, and a transmitter configured to transmit, to each of the plurality of terminals, respective timing data corresponding to respective specific periods of time, the timing data including different times indicating when different code images are displayed to the plurality of terminals, wherein in a first terminal of the terminals, the first period of time indicates only when a first code image is displayed by the display control device and is set as the specific period of time, and in a second terminal of the terminals, a second period of time different from the first period of time and indicating only when a second code image is displayed by the display control device is set as the specific period of time, the method comprising:

controlling, by a controller of the display control device the display unit to display a plurality of different parts of a code image according to a predetermined timing pattern of the timing data for the first period of time indicating only when a first code image is displayed by the display control device, and to display a particular, different code image as the code image for the second period of time, each particular code image representing a code for identifying a material stored in a server fetched from the server by the terminals according to the first and second periods of time;

combining, by the hardware processor of a terminal of the plurality of terminals, the plurality of different parts and the different code to obtain a combined code image based on a plurality of images displayed by the control device and photographed by the terminal during the respective specific period of time corresponding to the terminal of the hardware processor;

obtaining, by the hardware processor, the code by decoding the code image, and obtaining, by a receiver of the terminal, a material from the server based on the code obtained by the hardware processor.

* * * * *